US008934396B2

(12) United States Patent
Noh et al.

(10) Patent No.: US 8,934,396 B2
(45) Date of Patent: Jan. 13, 2015

(54) DATA TRANSMISSION METHOD FOR WIRELESS COMMUNICATION SYSTEM INVOLVING RELAY

(75) Inventors: Tae Gyun Noh, Daejeon (KR); Jae Young Ahn, Daejeon (KR); Hee Soo Lee, Daejeon (KR); Kyoung Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 121 days.

(21) Appl. No.: 13/235,723

(22) Filed: Sep. 19, 2011

(65) Prior Publication Data

US 2012/0002591 A1 Jan. 5, 2012

Related U.S. Application Data

(63) Continuation of application No. PCT/KR2010/001629, filed on Mar. 16, 2010.

(30) Foreign Application Priority Data

| | | |
|---|---|---|
| Mar. 17, 2009 | (KR) | 10-2009-0022521 |
| Mar. 20, 2009 | (KR) | 10-2009-0023960 |
| Apr. 28, 2009 | (KR) | 10-2009-0036866 |
| Apr. 30, 2009 | (KR) | 10-2009-0038276 |
| Jun. 22, 2009 | (KR) | 10-2009-0055390 |
| Jul. 3, 2009 | (KR) | 10-2009-0060454 |
| Aug. 18, 2009 | (KR) | 10-2009-0076179 |
| Nov. 2, 2009 | (KR) | 10-2009-0105098 |

(51) Int. Cl.

*H04B 7/14* (2006.01)
*H04B 7/26* (2006.01)

(Continued)

(52) U.S. Cl.

CPC .......... *H04B 7/2606* (2013.01); *H04B 7/15557* (2013.01); *H04W 72/0426* (2013.01);

(Continued)

(58) Field of Classification Search

CPC ........... H04W 72/0426; H04W 88/085; H04B 7/15542

USPC ........................................................ 455/7–25

See application file for complete search history.

(56) References Cited

U.S. PATENT DOCUMENTS 8,547,896 B2 * 10/2013 Park et al. .................... 370/315

(Continued)

FOREIGN PATENT DOCUMENTS

| | | |
|---|---|---|
| KR | 1020070035863 | 4/2007 |
| KR | 10-2008-0009639 | 1/2008 |

OTHER PUBLICATIONS

IEEE, Draft 8 of "Draft Amendment to IEEE Standard for Local and metropolitan area networks, Part 16: Air Interface for Fixed and Mobile Broadband Wireless Access Systems, Multihop Relay Specification", IEEE P802.16j/D8, published Dec. 22, 2008, p. 194-203. excerpt provided. Full document is available at http://www.ieee802.org/16/pubs/80216j.html.*

(Continued)

*Primary Examiner* — Khaled Kassim
*Assistant Examiner* — Zhaohui Yang
(74) *Attorney, Agent, or Firm* — Nelson Mullins Riley & Scarborough LLP

(57) ABSTRACT

Provided are an uplink transmission method and downlink transmission method in a mobile communication network including a relay. In the uplink and downlink transmission methods, frame structures and transmission timings of a backhaul downlink and a backhaul uplink are determined in consideration of at least one of a time for the relay to switch between transmission and reception and a signal transmission time. Accordingly, in a wireless communication system including a relay, it is possible to effectively perform data transmission and reception between the relay and a base station.

5 Claims, 23 Drawing Sheets

(51) Int. Cl.
*H04B 7/155* (2006.01)
*H04W 72/04* (2009.01)
*H04W 88/08* (2009.01)

(52) U.S. Cl.
CPC ......... *H04B 7/15542* (2013.01); *H04W 88/085* (2013.01)
USPC ........................................... 370/315; 370/319

(56) References Cited

U.S. PATENT DOCUMENTS

2007/0081603 A1 4/2007 Jang et al.
2007/0104223 A1 5/2007 Lee et al.
2007/0133388 A1 6/2007 Lee et al.
2008/0039011 A1 2/2008 Chang et al.
2008/0227386 A1* 9/2008 Dayal et al. ....................... 455/7
2010/0120442 A1* 5/2010 Zhuang et al. ................ 455/450
2011/0194523 A1* 8/2011 Chung et al. .................. 370/329

OTHER PUBLICATIONS

LG Electronics, “Comparison of in-band relaying methods in FDD mode,” 3GPP TSG RAN WG1 #56, R1-090664, 7 pages, (2009).
LG Electronics, “Consideration on Resource Allocation for Relay Backhaul Link,” 3GPP TSG RAN WG1 Meeting #56, R1-090790, 5 pages, (2009).
Motorola, “LTE signaling to support Relay operation,” 3GPP TSG RAN WG1 Meeting #55, R1-084412, 6 pages, (2008).
Supplementary European Search Report for Application No. 10753684.9, 10 pages, dated Jan. 8, 2013.
International Search Report for Application No. PCT/KR2010/001629, dated Nov. 17, 2010.

* cited by examiner

FIG.1
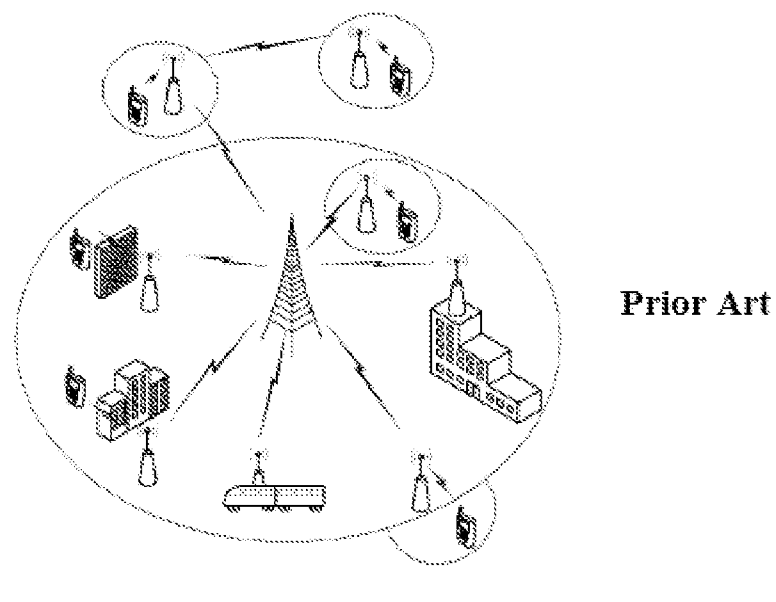
Prior Art
(a)
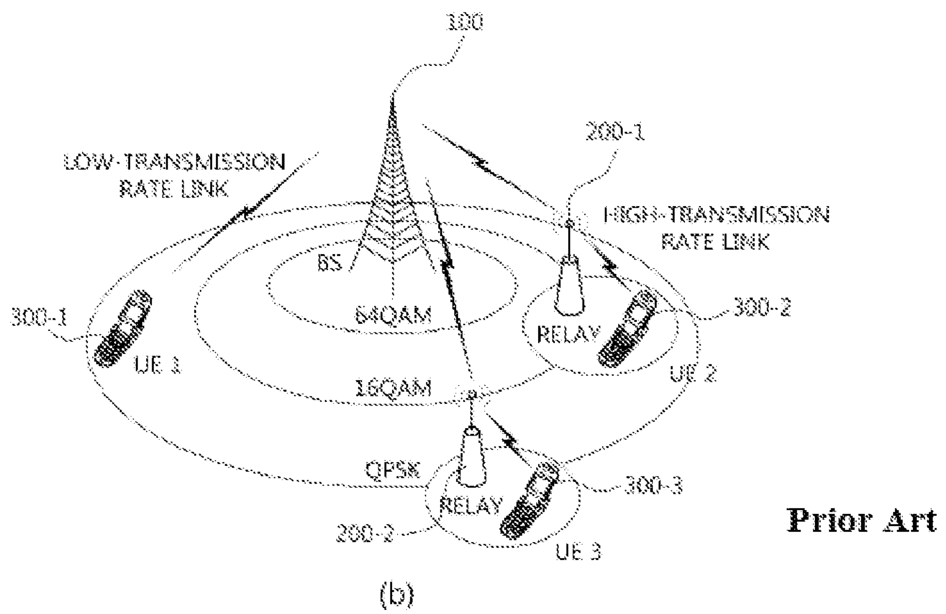
Prior Art
(b)

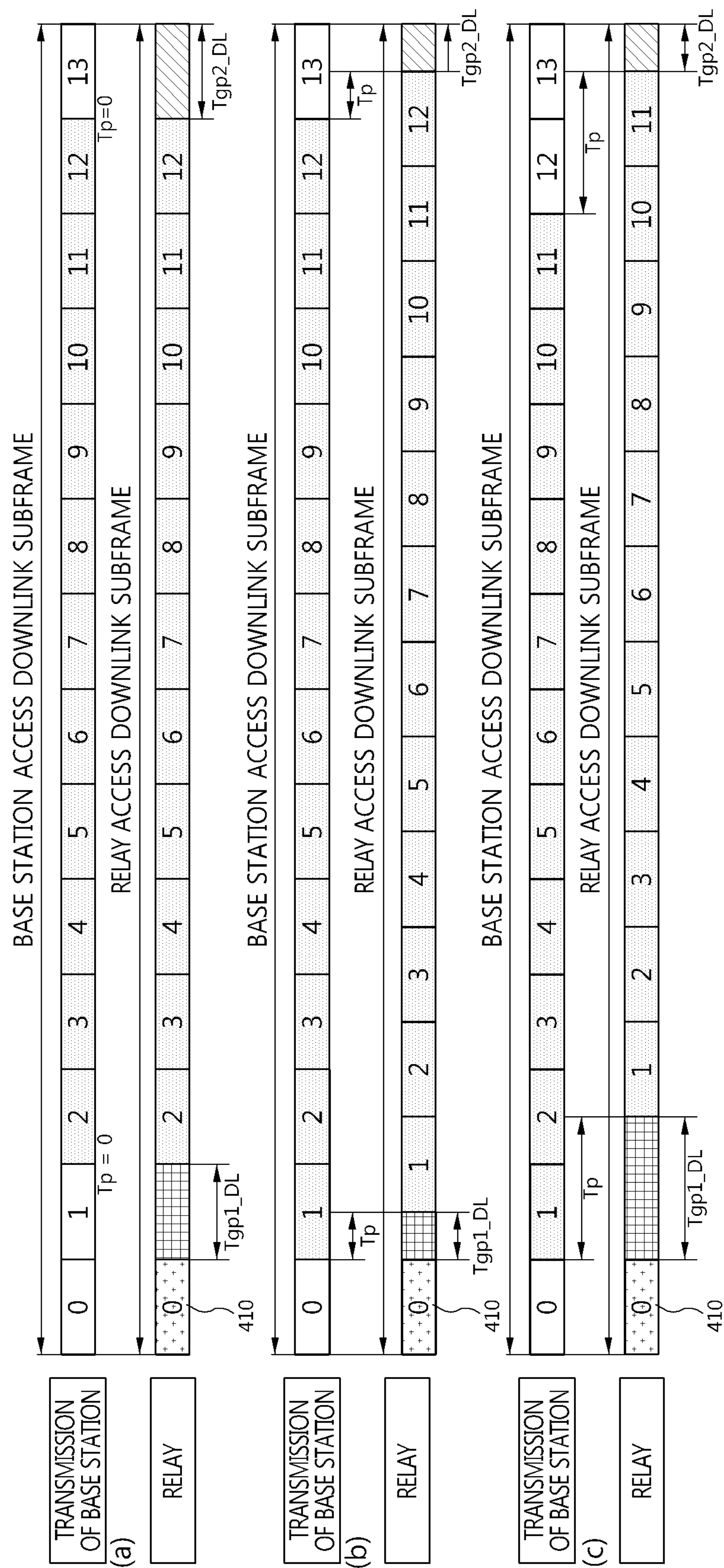
FIG.6
(a)
TRANSMISSION OF BASE STATION
RELAY
BASE STATION ACCESS DOWNLINK SUBFRAME
RELAY ACCESS DOWNLINK SUBFRAME
0 1 2 3 4 5 6 7 8 9 10 11 12 13
Tp = 0
Tp=0
Tgp1_DL
Tgp2_DL
410
(b)
TRANSMISSION OF BASE STATION
RELAY
BASE STATION ACCESS DOWNLINK SUBFRAME
RELAY ACCESS DOWNLINK SUBFRAME
Tp
Tgp1_DL
Tgp2_DL
410
(c)
TRANSMISSION OF BASE STATION
RELAY
BASE STATION ACCESS DOWNLINK SUBFRAME
RELAY ACCESS DOWNLINK SUBFRAME
Tp
Tgp1_DL
Tgp2_DL
410

(a)
(b)
(c)
TRANSMISSION OF RELAY
RECEPTION OF BASE STATION
BACKHAUL UPLINK SUBFRAME
BASE STATION ACCESS UPLINK SUBFRAME
Tgp1_UL
Tgp2_UL
Tp=0
Tp
0 1 2 3 4 5 6 7 8 9 10 11 12 13

WHEN ONE SEPARATE BACKHAUL UPLINK SUBFRAME IS TRANSMITTED

WHEN TWO CONSECUTIVE BACKHAUL UPLINK SUBFRAMES ARE TRANSMITTED

BACKHAUL UPLINK SUBFRAME
(a)
810
820
(b)
401
810
820
402
(c)
401
810
820
402
(d)
401
810
820
402
(e)
401
810
820
402

(a)
(b)
(c)
(d)
(e)
(f)
(g)
(h)
BACKHAUL UPLINK SUBFRAME
1000
401
402

(a)
(b)
(c)
(d)
(e)
(f)
(g)
(h)
BACKHAUL UPLINK SUBFRAME
1000
401
402

DATA TRANSMISSION METHOD FOR WIRELESS COMMUNICATION SYSTEM INVOLVING RELAY

RELATED APPLICATIONS

This application is a continuation of PCT Application No. PCT/KR2010/001629 filed on Mar. 16, 2010, which claims priority to, and the benefit of, Korean Patent Application No. 10-2009-0022521 filed Mar. 17, 2009, Korean Patent Application No. 10-2009-0023960 filed Mar. 20, 2009, Korean Patent Application No. 10-2009-0036866 filed Apr. 28, 2009, Korean Patent Application No. 10-2009-0038276 filed Apr. 30, 2009, Korean Patent Application No. 10-2009-0055390 filed Jun. 22, 2009, Korean Patent Application No. 10-2009-0060454 filed Jul. 3, 2009, Korean Patent Application No. 10-2009-0076179 filed Aug. 18, 2009 and Korean Patent Application No. 10-2009-0105098 filed Nov. 2, 2009. The contents of the aforementioned applications are hereby incorporated by reference.

BACKGROUND

The present invention relates to data transmission and reception in a wireless communication system, and more particularly, to data transmission and reception between a relay and a base station in a wireless communication system including the relay.

A relay station (RS) is a device serving as an intermediary between a base station and user equipment (UE). As illustrated in FIGS. 1A and 1B, an RS is deployed in a dead zone or at a cell boundary to effectively extend cell coverage and increase a throughput without adding a new base station or establishing a wired backhaul.

FIG. 1A shows a relay use model in which coverage can be extended using a relay. To be specific, FIG. 1A shows a case in which relays are deployed at the cell coverage boundary of a donor base station and outside the cell coverage boundary and provide service to UEs located outside the cell radius of the base station, and a case in which relays relay a signal of the base station to UEs that are located among buildings, in a building having a poor wireless environment, in a subway train, and across a cluster of buildings from the base station.

FIG. 1B shows a relay use model in which a cell throughput is improved using a relay. Relays 200-1 and 200-2 shown in FIG. 1B are located within the cell radius of the donor base station 100 and provide service of better quality to UEs located close to a cell boundary, compared to a case in which there is no relay. In other words, when there is no relay between the base station 100 and a first UE 300-1, a low transmission rate, for example, a quadrature phase-shift keying (QPSK) link, is provided to the first UE 300-1. On the other hand, when a second UE 300-2 and a third UE 300-3 are located within a relay cell radius, the relay transmits data received from the base station 100 to the second UE 300-2 and the third UE 300-3 at a high transmission rate, such as 64 quadrature amplitude modulation (QAM), so that a cell throughput can be improved.

Using relay technology, data can be transmitted between a base station and a UE in various ways. For example, a base station directly transmits data to a UE without a relay, or a relay between a base station and a UE relays data, which extends existing cell coverage and improves a throughput. As another example, an additional UE performs relay transmission between a base station and a UE, which requires autonomic constitution and management of an ad-hoc network. This transmission method is suited to support an emergency call capable of replacing communication that is impossible over an existing network.

When such a relay function is adopted in a wireless communication network, there is a change in a wireless link. That is, while two links between a base station and a UE are enough for conventional art, an added relay requires an additional wireless link. In other words, an uplink and downlink between a donor base station and a relay and an uplink and downlink between the relay and a UE should be additionally taken into consideration.

Thus far, much research has been conducted in relation to the relay technology by organizations for standardization such as long term evolution (LTE)-advanced of third generation partnership project (3GPP), Institute of Electrical and Electronics Engineers (IEEE) 802.16m, etc. However, a detailed procedure, a channel configuration method, a channel transmission method, etc. for data transmission and reception between a relay and a base station have not been suggested yet, and thus are needed.

SUMMARY

The present invention is directed to providing a procedure, a channel configuration, a channel transmission method, etc. for data transmission and reception between a relay and a base station in a wireless communication system.

One aspect of the present invention provides a downlink transmission method in a mobile communication network including a relay, the method including: transmitting, at a base station, a backhaul downlink signal according to a frame structure of a backhaul downlink and a timing of the backhaul downlink determined in consideration of at least one of a time for the relay to switch between transmission and reception and a signal transmission time; and receiving, at the relay, the backhaul downlink signal according to the frame structure and the timing of the backhaul downlink.

Transmitting the backhaul downlink signal may include transmitting, at the base station, the backhaul downlink signal using symbols for backhaul downlink signal transmission including all symbols of a base station access downlink subframe except as many symbols beginning with a first symbol as (a number of symbols through which a relay access downlink control channel is transmitted+1). Here, a start time point of a relay access downlink subframe related to the timing of the backhaul downlink may be set to be later than a point in time when the relay begins to receive the first symbol of the base station access downlink subframe by a length of a downlink following guard period.

Transmitting the backhaul downlink signal may include transmitting the backhaul downlink signal using symbols for backhaul downlink signal transmission including all symbols of a base station access downlink subframe except as many symbols beginning with a first symbol as a number of symbols through which a relay access downlink control channel is transmitted and a last symbol as maximum.

Here, a start time point of a relay access downlink subframe related to the timing of the backhaul downlink may be set to be earlier than a point in time when the relay begins to receive the first symbol of the base station access downlink subframe by a sum of a length of a time period in which control information about a relay access downlink is transmitted and a length of a downlink preceding guard period.

To set a start time point of a relay access downlink subframe to a start time point of a base station access downlink subframe, a transmission time of the relay access downlink subframe may be set to be earlier than a point in time when the relay begins to receive a first symbol of the base station access downlink subframe by half a time indicated by timing advance information transmitted by the base station to the relay.

Transmitting the backhaul downlink signal may include transmitting the backhaul downlink signal using symbols for backhaul downlink signal transmission including all symbols of the base station access downlink subframe except as many symbols beginning with the first symbol as a number of symbols through which a relay access downlink control channel is transmitted. Here, the start time point of the relay access downlink subframe related to the timing of the backhaul downlink may be set to the point in time when the relay begins to receive the first symbol of the base station access downlink subframe.

The downlink transmission method may further include transmitting, at the relay, a relay access downlink subframe to relay user equipment (UE) according to the frame structure and the timing of the backhaul downlink.

The frame structure and the timing of the backhaul downlink may be determined in further consideration of at least one of a time period in which control information about a relay access downlink, which is a downlink to the relay UE, is transmitted from the relay, and a time period in which control information about a base station access downlink, which is a downlink to a base station UE, is transmitted from the relay.

Meanwhile, the downlink transmission method may further include, before transmitting a backhaul downlink signal, transmitting, at the relay, information about a time for switching between transmission and reception to the base station.

The information about a time for switching between transmission and reception may be transmitted by upper layer signaling, in particular, radio resource control (RRC) signaling.

Another aspect of the present invention provides an uplink transmission method in a mobile communication network including a relay, the method including: transmitting, at the relay, a backhaul uplink signal according to a frame structure and a timing of a backhaul uplink determined in consideration of at least one of a time for the relay to switch between transmission and reception and a signal transmission time; and receiving, at a base station, the backhaul uplink signal according to the frame structure and the timing of the backhaul uplink.

Transmitting the backhaul uplink signal may include transmitting, at the relay, the backhaul uplink signal using symbols for backhaul uplink signal transmission including symbols of a backhaul uplink subframe beginning with a second symbol and ending with a last symbol. Here, a start time point of the backhaul uplink subframe related to the timing of the backhaul uplink may be set to be later than a point in time when the relay transmits a base station access uplink signal in a UE mode of relay by a length of an uplink following guard period.

Transmitting the backhaul uplink signal may include transmitting the backhaul uplink signal using symbols for backhaul uplink signal transmission including symbols of a backhaul uplink subframe beginning with a first symbol and ending with a second to last symbol. Here, a start time point of the backhaul uplink subframe related to the timing of the backhaul uplink may be set to be later than a point in time when the relay transmits a base station access uplink signal in a UE mode of relay by an uplink preceding guard period.

Transmitting the backhaul uplink signal may include transmitting the backhaul uplink signal using symbols for backhaul uplink signal transmission including symbols of a backhaul uplink subframe beginning with a second symbol and ending with a last symbol as maximum, and a start symbol and an end symbol of the symbols for backhaul uplink signal transmission may vary according to at least one of a length of a signal transmission time of the backhaul uplink and the time for the relay to switch between transmission and reception. Here, a start time point of the backhaul uplink subframe related to the timing of the backhaul uplink may be set to a start time point of a base station access uplink subframe. The start time point of the backhaul uplink subframe related to the timing of the backhaul uplink may also be set to be later than a point in time when the relay transmits a base station access uplink signal in a UE mode of relay by half a time indicated by timing advance information transmitted by the base station to the relay.

Transmitting the backhaul uplink signal may include transmitting the backhaul uplink signal using symbols for backhaul uplink signal transmission including symbols of a backhaul uplink subframe beginning with a first symbol and ending with a last symbol. Here, a start time point of the backhaul uplink subframe related to the timing of the backhaul uplink may be set to a point in time when the relay transmits a base station access uplink signal in a UE mode of relay.

Still another aspect of the present invention provides a relay device that performs transmission and reception with a base station through a backhaul link, notifies the base station of information about a time required for switching between transmission and reception, receives a backhaul downlink signal from the base station according to a frame structure and a timing of a backhaul downlink determined in consideration of the time required for switching between transmission and reception, and transmits a backhaul uplink signal to the base station according to a frame structure and a timing of a backhaul uplink determined in consideration of the time required for switching between transmission and reception.

Yet another aspect of the present invention provides a base station that communicates with at least one relay through a backhaul link, and receives a backhaul downlink signal according to a frame structure and a timing of a backhaul downlink determined in consideration of a time for the relay to switch between transmission and reception and a signal transmission time.

Yet another aspect of the present invention provides a downlink transmission method, including selecting, at a base station, at least one piece of period configuration information among a plurality of pieces of predefined period configuration information of a backhaul link signal. The period configuration information may include information about symbols in a base station access downlink subframe through which a signal is actually transmitted, information about a downlink transmission timing of a relay according to the information about the symbols, information about symbols in a whole backhaul uplink subframe through which a signal is transmitted, and information about a backhaul uplink transmission timing of the relay and a backhaul uplink reception timing of the base station according to the information about the symbols.

Yet another aspect of the present invention provides an uplink transmission method in a mobile communication network including a relay, the method including: when two or more backhaul uplink subframes to be transmitted to a base station are consecutively disposed, replacing, at the relay, a guard period disposed at a position where one backhaul uplink subframe is in contact with the other backhaul uplink subframe with a backhaul uplink signal period to adaptively configure a backhaul uplink subframe; and performing backhaul uplink transmission using the configured uplink frame.

The uplink transmission method may further include: receiving, at the base station, the two or more consecutive backhaul uplink subframes from the relay; and inferring, at the base station, a format of the two or more consecutive backhaul uplink subframes from a format of a predefined separate backhaul uplink subframe.

A format of a separate backhaul uplink subframe that will be used by the relay may be fixed or predefined.

Meanwhile, the uplink transmission method may further include transmitting, at the base station, information about the format of the separate backhaul uplink subframe that will be used by the relay to the relay in advance, and the information about the format of the separate backhaul uplink subframe that will be used by the relay may be information about a subframe format selected from among at least one backhaul uplink subframe format predefined between the base station and the relay.

Also, the information about the selected subframe format may be transmitted by upper layer signaling.

In configuring the uplink frame, the uplink frame may be configured in a form in which a first backhaul uplink demodulation reference signal and a second backhaul uplink demodulation reference signal are disposed in one backhaul uplink subframe.

As many symbols as (half a maximum number of symbols that one backhaul uplink subframe can include−1) may be interposed between the first backhaul uplink demodulation reference signal and the second backhaul uplink demodulation reference signal.

In configuring the uplink frame, the uplink frame may be configured in a form in which only one backhaul uplink demodulation reference signal is disposed in one backhaul uplink subframe.

The backhaul uplink demodulation reference signal may be disposed at a position in the one backhaul uplink subframe at which a difference between a number of symbols preceding the backhaul uplink demodulation reference signal and a number of symbols following the backhaul uplink demodulation reference signal does not exceed three.

Yet another aspect of the present invention provides a relay device that when two or more backhaul uplink subframes to be transmitted to a base station are consecutively disposed, replaces a guard period disposed at a position where one backhaul uplink subframe is in contact with the other backhaul uplink subframe with a backhaul uplink signal period to adaptively configure a backhaul uplink subframe, and performs backhaul uplink transmission using the configured uplink frame.

Yet another aspect of the present invention provides a base station that when two or more backhaul uplink subframes are consecutively received from a relay, infers a format of the two or more consecutive backhaul uplink subframes from a format of a separate backhaul uplink subframe.

Yet another aspect of the present invention provides a backhaul downlink transmission method, including: determining a transmission start time point of a backhaul downlink signal in consideration of a number of symbols through which a relay access downlink control channel is transmitted and a number of symbols through which a base station access downlink control channel is transmitted; and transmitting, at a base station, the backhaul downlink signal to a relay according to the determined transmission start time point of the backhaul downlink signal.

The backhaul downlink transmission method may further include, before determining a transmission start time point of a backhaul downlink signal, notifying, at the relay, the base station of the number of symbols through which a relay access downlink control channel is transmitted.

The backhaul downlink transmission method may further include transmitting, at the base station, information about a number of symbols through which a relay access downlink physical control channel of a relay access downlink signal is transmitted to the relay before transmission of the relay access downlink physical control channel.

The backhaul downlink signal may be transmitted through a backhaul downlink physical control channel and a backhaul downlink physical data channel, and the backhaul downlink physical data channel may include a part of a region allocated in advance as the backhaul downlink physical control channel.

The backhaul downlink physical control channel may include information indicating whether or not the backhaul downlink physical data channel includes a part of the region allocated as the backhaul downlink physical control channel.

Relay system information, which is applied in common to all relays interoperating with the base station, may be transmitted through a relay-common backhaul downlink physical control channel, which is a part of the backhaul downlink physical control channel.

The relay system information may vary according to relay system information modification period, and may not vary in one relay system information modification period.

The relay-common backhaul downlink physical control channel may include a notification of whether the relay system information varies in a next modification period.

The notification of whether the relay system information varies may be included one or more times in one modification period.

Data for checking a transmission error of the relay-common backhaul downlink physical control channel may be masked with a relay-common identifier that can be applied to all relays interoperating with the base station.

The base station may transmit at least one of information indicating whether or not each base station access downlink includes a backhaul downlink signal, and allocation information of a backhaul uplink subframe to the relay.

The information indicating whether or not each base station access downlink includes a backhaul downlink signal, and the allocation information of a backhaul uplink subframe may be set to be different according to the respective relays interoperating with the base station or relay groups, or applied the same to all the relays interoperating with the base station.

The base station may transmit resource allocation information about the backhaul downlink physical data channel and a backhaul uplink physical data channel transmitted be the relay to the base station to the relay, and the allocation information about the backhaul downlink physical data channel and a backhaul uplink physical data channel transmitted be the relay to the base station may include information about a range of the backhaul uplink physical data channel to which the resource allocation information is applied.

Yet another aspect of the present invention provides a backhaul downlink transmission method in a mobile communication system in which a base station communicates with a relay through a backhaul link, the method including: receiving, at the base station or the relay, data including one or more codewords from the counterpart through the backhaul link; and configuring response information using a bundling mode in which one piece of acknowledge information is configured for all the received one or more codewords, and transmitting the configured response information to the counterpart.

All the one or more codewords may be included in one subframe, or the respective codewords may be included in different subframes.

When the base station releases the bundling mode, the base station may notify the relay of release of the bundling mode.

Using an exemplary embodiment of the present invention, it is possible to effectively perform data transmission and reception between a relay and a base station in a wireless communication system including the relay.

BRIEF DESCRIPTION OF DRAWINGS

FIG. 1A shows a relay use model in which coverage can be extended using a relay.

FIG. 1B shows a relay use model in which a cell throughput is improved using a relay.

FIG. 6 illustrates a relationship between transmission and reception of a backhaul downlink signal between a base station and a relay based on a downlink transmission method according to still another exemplary embodiment of the present invention.

DESCRIPTION OF EMBODIMENTS

Figure 2:
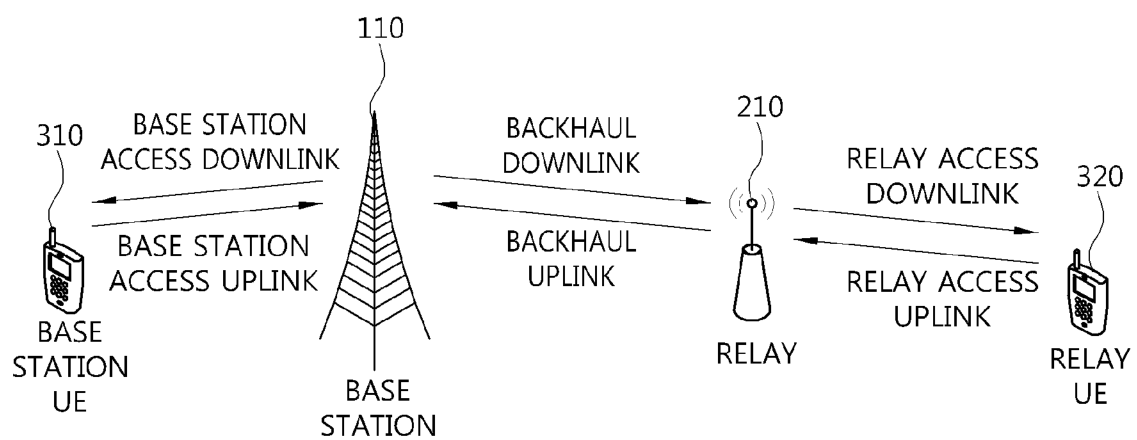
FIG. 2 shows six signal transmission and reception links in a wireless communication system according to an exemplary embodiment of the present invention.

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

As used herein, the term "user equipment (UE)" may be referred to as a mobile station, user terminal (UT), wireless terminal, access terminal (AT), terminal, subscriber unit, subscriber station (SS), wireless device, wireless communication device, wireless transmit/receive unit (WTRU), moving node, mobile, or other terms. Various exemplary embodiments of a UE may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

In this specification, the term "base station" is used to denote a "control device that controls one cell." In an actual communication system, a "physical base station" can control a plurality of cells. In this case, the "physical base station" can be considered to include several "base stations" of the present invention. Also, the term "relay" is used to denote a "control device that controls one cell." In an actual communication system, a "physical relay" can control a plurality of cells. In this case, the "physical relay" can be considered to include several "relays" of the present invention. In other words, it is possible to consider that different parameters are allocated to respective cells by respective "base stations" or "relays."

With reference to the appended drawings, exemplary embodiments of the present invention will be described in detail below. To aid in understanding the present invention, like numbers refer to like elements throughout the description of the figures, and the description of the same component will not be reiterated.

FIG. 2 shows six signal transmission and reception links in a wireless communication system according to an exemplary embodiment of the present invention.

Referring to FIG. 2, a wireless communication system according to an exemplary embodiment of the present invention includes a base station 110, a relay 210, a base station UE 310, and a relay UE 320. The base station UE 310 belongs to a base station cell and exchanges signals with the base station 110. A link through which the base station 110 transmits a signal to the base station UE 310 is referred to as a base station access downlink, and a link through which the base station UE 310 transmits a signal to the base station 110 is referred to as a base station access uplink.

The relay 210 operates as a base station UE at the initial stage of deployment. In other words, the base station 110 considers the relay 210 to be one base station UE 310 and exchanges signals with the relay 210 through a base station access uplink/downlink. An operation mode corresponding to the case in which a relay operates in this way is referred to as a UE mode of relay. In the UE mode of relay, the relay 210 exchanges information required for configuring a relay cell, etc. with the base station 110.

After this, the relay 210 configures its own cell as a base station and can exchange signals with a UE. An operation mode corresponding to this case is referred to as a base station mode of relay. A UE that belongs to a relay when the relay is in the base station mode is referred to as a relay UE. Also, a link through which the relay 210 transmits a signal to the relay UE 320 is referred to as a relay access downlink, and a link through which the relay UE 320 transmits a signal to the relay 210 is referred to as a relay access uplink. When the relay 210 is in the base station mode, a link through which the base station 110 transmits a signal to the relay 210 is referred to as a backhaul downlink, and a link through which the relay 210 transmits a signal to the base station 110 is referred to as a backhaul uplink.

Also, the relay 210 can be switched to the UE mode when the relay 210 loses uplink timing synchronization with the base station 110 while operating in the base station mode. The relay 210 operating in the UE mode performs random access to obtain uplink timing synchronization with the base station 110. After this, the relay 210 is switched to the base station mode and can exchange signals with the relay UE 320 again.

A base station access downlink subframe and a relay access downlink subframe will be described in detail below.

A base station access downlink frame consists of a plurality of base station access downlink subframes. According to a base station access downlink subframe, a base station may transmit a base station access downlink signal alone or a backhaul downlink signal alone. Also, the base station may transmit a base station access downlink signal and a backhaul downlink signal together. In this case, the base station access downlink signal and the backhaul downlink signal can be transmitted in different regions. Here, a region denotes a combination of a time domain, frequency domain, spatial domain, code domain, and so on. A base station access downlink signal may include a base station access downlink physical data channel, a base station access downlink physical control channel, a base station access downlink reference signal, a base station access synchronization signal, etc. and may further include another channel or signal in addition to the aforementioned channels or signals. A backhaul downlink signal may include a backhaul downlink physical data channel, a backhaul downlink physical control channel, a backhaul downlink reference signal, etc. and may further include another channel or signal in addition to the aforementioned channels or signal.

Meanwhile, a relay access downlink frame consists of a plurality of relay access downlink subframes. According to a relay access downlink subframe, a relay may transmit a relay access downlink signal alone or receive a backhaul downlink signal alone. Also, the relay may transmit the relay access downlink signal and receive the backhaul downlink signal. To be specific, the relay can transmit the relay access downlink signal in the whole relay access downlink subframe. Also, to receive the backhaul downlink signal, the relay may not transmit the relay access downlink signal in a part or all of regions of the relay access downlink subframe. Here, a region denotes a combination of a time domain, frequency domain, spatial domain, code domain, and so on. In an exemplary embodiment in which a backhaul downlink signal is received from a relay access downlink subframe, a relay may configure the relay access downlink subframe as a Multicast Broadcast Single Frequency Network (MBSFN) subframe and notify a relay UE of a domain in which a relay access downlink signal is transmitted.

In the base station mode of relay, a relay can have a guard period before, after, or before and after reception of a backhaul downlink signal to switch between downlink transmission and downlink reception performed at the radio frequency (RF) terminal of the relay. During the guard period, the relay neither receives a backhaul downlink signal nor transmits a relay access downlink signal. A guard period from when the relay transmits a relay access downlink signal to when the relay receives a backhaul downlink signal is referred to as a downlink preceding guard period GP1_DL, and the length of GP1_DL is indicated by Tgp1_DL. Tgp1_DL is equal to or greater than a time for switching from downlink transmission to downlink reception at the RF terminal of the relay. A guard period from when the relay receives a backhaul downlink signal to when the relay transmits a relay access downlink signal is referred to as a downlink following guard period GP2_DL, and the length of GP2_DL is indicated by Tgp2_DL. Tgp2_DL is equal to or greater than a time for switching from downlink reception to downlink transmission at the RF terminal of the relay.

Next, downlink timing alignment, that is, timing between downlink transmission of a base station and downlink transmission and reception of a relay will be described below.

In the UE mode of relay, a relay receives a base station access downlink signal transmitted from a base station. The base station downlink signal arrives at the relay after a time as long as a signal propagation delay between the base station and the relay, which can be seen in FIG. 3.

Figure 3:
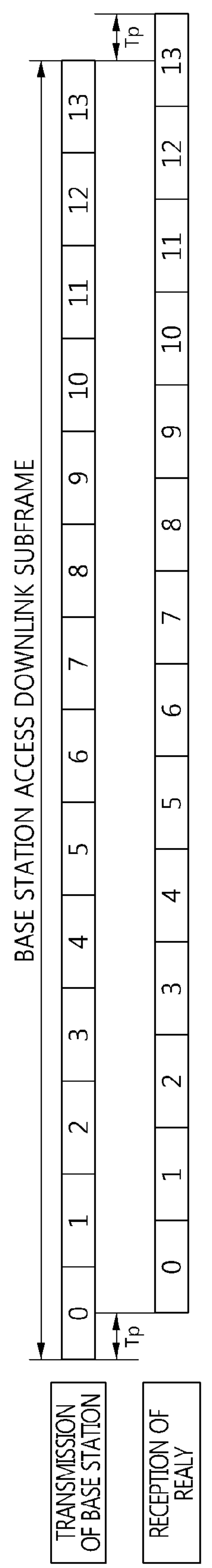
FIG. 3 illustrates a relationship between transmission and reception of a base station access downlink signal between a base station and a relay.

FIG. 3 illustrates a relationship between transmission and reception of a base station access downlink signal between a base station and a relay. In the drawing, Tp denotes a signal transmission time between the base station and the relay.

In the base station mode of relay, the period of a backhaul downlink signal that can be exchanged between a base station and a relay may vary according to the length of a guard period, that is, the length Tgp1_DL of a downlink preceding guard period and the length Tgp2_DL of a downlink following guard period (see FIG. 4), a time required for switching between downlink transmission and downlink reception at the RF terminal of the relay, and the start time point of a relay access downlink subframe.

The present invention suggests exemplary embodiments of a timing relationship in the period of a backhaul downlink signal that can be exchanged between a base station and a relay.

In a detailed constitution, the following are assumed. A base station access downlink subframe consists of L symbols, and the serial numbers of the symbols begin with 0. Thus, symbol m denotes an (m+1)th symbol of the base station access downlink subframe. Also, a relay access downlink subframe consists of a plurality of symbols, and the serial numbers of the symbols begin with 0. In a relay access downlink subframe, the number of symbols through which a relay access downlink physical control channel of a relay access downlink signal is transmitted is k. k is 0 or a positive integer. A base station access downlink signal transmitted by the base station is received by the relay after Tp. Also, the length of a base station access downlink subframe is the same as that of a relay access downlink subframe.

With reference to FIGS. 4 to 7, backhaul downlink transmission methods according to exemplary embodiments of the present invention will be described below.

Figure 4:
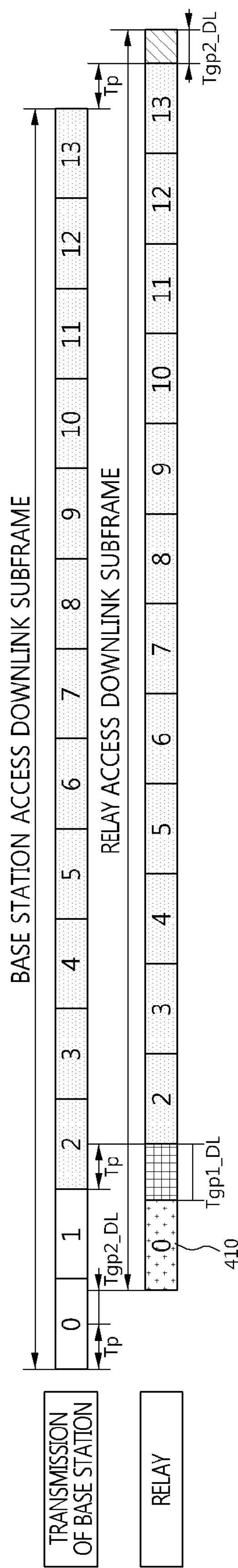
FIG. 4 illustrates a relationship between transmission and reception of a backhaul downlink signal between a base station and a relay based on a downlink transmission method according to an exemplary embodiment of the present invention.

FIG. 4 illustrates a relationship between transmission and reception of a backhaul downlink signal between a base station and a relay based on a downlink transmission method according to an exemplary embodiment of the present invention.

FIG. 4 illustrates frame structures of a base station and a relay on the assumption that k=1 and L=14. Also, it is assumed that a time for switching from downlink transmission to downlink reception at the RF terminal of the relay and a time for switching from downlink reception to downlink transmission at the RF terminal of the relay are each greater than the cyclic prefix of a symbol.

In the exemplary embodiment shown in FIG. 4, a relay sets the start time point of a relay access downlink subframe to be later than a point in time when the relay begins to receive the first symbol of a base station access downlink subframe by Tgp2_DL. In this case, the base station can transmit a backhaul downlink signal through symbol k+1 to the last symbol of the base station access downlink subframe. As mentioned above, k denotes the number of symbols through which a relay access downlink physical control channel 410 is transmitted. The relay can receive the backhaul downlink signal through symbol k+1 to the last symbol of the base station access downlink subframe. For example, looking at frame structures and a timing relationship of the base station and the relay shown in FIG. 4, the base station transmits a backhaul downlink signal through symbol 2 to symbol 13, and the relay receives the backhaul downlink signal through symbol 2 to symbol 13.

As described above, the first symbol of a backhaul downlink signal that can be exchanged between a base station and a relay varies according to a time period in which the relay access downlink physical control channel 410 of a relay access downlink signal is transmitted, that is, the number k of symbols. Also, the first symbol of a backhaul downlink signal that can be exchanged between a base station and a relay may vary according to the number of symbols through which a base station access downlink physical control channel of a base station access downlink signal is transmitted. In this case, the base station may notify the relay of the position information of the first symbol of the backhaul downlink signal. The position information of the first symbol of the backhaul downlink signal can be transferred by upper layer signaling (radio resource control (RRC) signaling in the case of third generation partnership project (3GPP)) or through a backhaul downlink physical control channel.

Figure 5:
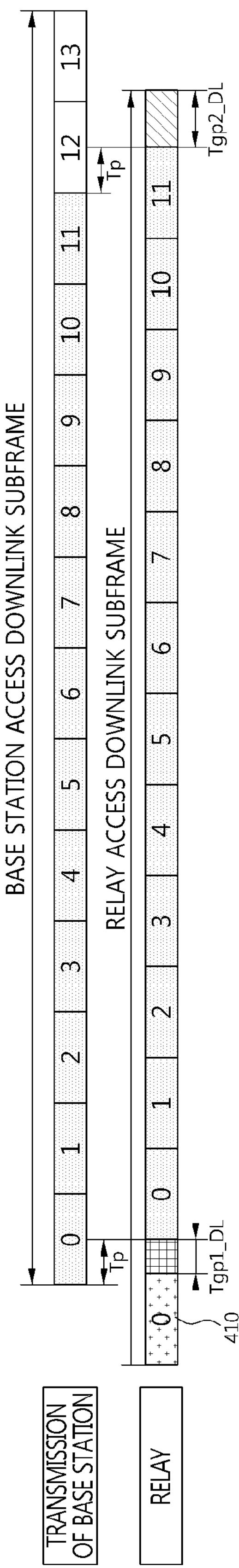
FIG. 5 illustrates a relationship between transmission and reception of a backhaul downlink signal between a base station and a relay based on a downlink transmission method according to another exemplary embodiment of the present invention.

FIG. 5 illustrates a relationship between transmission and reception of a backhaul downlink signal between a base station and a relay based on a downlink transmission method according to another exemplary embodiment of the present invention.

Like FIG. 4, FIG. 5 illustrates frame structures of a base station and a relay on the assumption that k=1 and L=14. Also, it is assumed that a time for switching from downlink transmission to downlink reception at the RF terminal of the relay and a time for switching from downlink reception to downlink transmission at the RF terminal of the relay are each greater than the cyclic prefix of a symbol.

In the exemplary embodiment shown in FIG. 5, a relay sets the start time point of a relay access downlink subframe to be earlier than a point in time when the relay begins to receive the first symbol of a base station access downlink subframe by the sum of the length of k symbols (e.g., one symbol in FIG. 5) and Tgp1_DL. In this case, the base station can transmit a backhaul downlink signal through the first symbol to symbol n of the base station access downlink subframe. Here, n=L−k−2. The relay can receive the backhaul downlink signal through the first symbol to symbol n of the base station access downlink subframe. In the exemplary embodiment of FIG. 5, the base station transmits a backhaul downlink signal through symbol 0 to symbol 11, and the relay receives the backhaul downlink signal through symbol 0 to symbol 11.

FIG. 6 illustrates a relationship between transmission and reception of a backhaul downlink signal between a base station and a relay based on a downlink transmission method according to still another exemplary embodiment of the present invention.

Like FIGS. 4 and 5, FIG. 6 illustrates frame structures of a base station and a relay on the assumption that k=1 and L=14. Also, it is assumed that a time for switching from downlink transmission to downlink reception at the RF terminal of the relay and a time for switching from downlink reception to downlink transmission at the RF terminal of the relay are each greater than the cyclic prefix of a symbol.

FIG. 6 shows that the structures of a backhaul downlink subframe transmitted by a base station and a backhaul downlink subframe received by a relay may vary as illustrated in FIGS. 6(A), 6(B), and 6(C) according to the length of the signal transmission time Tp. FIG. 6(A) illustrates a case in which Tp is 0, FIG. 6(B) illustrates a case in which Tp has the value of a positive real number larger than 0, and FIG. 6(C) illustrates a case in which Tp has the value of a positive real number larger than Tp of FIG. 6(B). In other words, Tp increases from FIG. 6(A) to FIG. 6(C).

In the exemplary embodiment of FIG. 6, the relay sets the start time point of a relay access downlink subframe to be similar to the start time point of a base station access downlink subframe. To this end, the relay may set the transmission time point of the relay access downlink subframe to be earlier than a point in time when the relay begins to receive the first symbol of the base station access downlink subframe by half a time indicated by timing advance information transmitted by the base station to the relay. In this way, the start time point of the relay access downlink subframe can be almost the same as the start time point of the base station access downlink subframe. In this case, the base station can transmit a backhaul downlink signal through symbol m to symbol n of the base station access downlink subframe. The relay can receive the backhaul downlink signal through symbol m to symbol n of the base station access downlink subframe. Here, $m \geq k$, and $n \leq L-2$.

Meanwhile, according to the length of the signal transmission time Tp, the lengths Tgp1_DL and Tgp2_DL of the guard periods may vary, and also the period of a backhaul downlink signal that can be exchanged between the relay and the base station may vary. The signal transmission time Tp may vary according to the location where the relay is deployed. The base station can transmit information about the period of a backhaul downlink signal that will be received by the relay to the relay by upper layer signaling (RRC signaling in the case of 3GPP). As an exemplary embodiment of the information about the period of a backhaul downlink signal, the respective indices of the first symbol and the last symbol of the backhaul downlink signal can be known. As another exemplary embodiment of the period information of a backhaul downlink signal, the periods of a plurality of backhaul downlink signals may be determined in advance, and one of the periods may be known. The relay receives a backhaul uplink signal on the basis of the backhaul downlink signal period information received from the base station.

In brief, in the exemplary embodiment of the present invention illustrated in FIG. 6, the base station can transmit a backhaul downlink signal using symbols for backhaul downlink signal transmission including all symbols of a base station access downlink subframe except symbols beginning with the first symbol through which a relay access downlink control channel is transmitted and the last symbol as maximum. Here, the start symbol and the end symbol among the symbols for backhaul downlink signal transmission may vary according to the length of the signal transmission time of a backhaul downlink.

As mentioned above, the first symbol of a backhaul downlink signal that can be exchanged between a base station and a relay varies according to the number k of symbols through which a relay access downlink physical control channel of a relay access downlink signal is transmitted. In addition to this, the first symbol of a backhaul downlink signal that can be exchanged between a base station and a relay may vary according to the number of symbols through which a base station access downlink physical control channel of a base station access downlink signal is transmitted. In this case, the base station can notify the relay of the position information of the first symbol of the backhaul downlink signal. The position information of the first symbol of the backhaul downlink signal can be transferred by upper layer signaling (RRC signaling in the case of 3GPP) or through a backhaul downlink physical control channel.

Referring to FIGS. 6(A) to 6(C) in further detail, it can be seen that the period of a backhaul downlink signal that is exchanged between a base station and a relay varies according to Tp. To be specific, in the case of FIG. 6(A) where Tp is equal to 0, a backhaul downlink signal period ranges from symbol 2 to symbol 12, and in the case of FIG. 6(B) where Tp is a positive real number, a backhaul downlink signal period ranges from symbol 1 to symbol 12. Also, in the case of FIG. 6(C) where the signal transmission time Tp is greater than Tp of FIG. 6(B), a backhaul downlink signal period may range from symbol 1 to symbol 11. In addition to these, a backhaul downlink signal period may range from symbol 1 to symbol 10, symbol 1 to symbol 9, etc. according to the signal transmission time Tp. Backhaul downlink signal period information can indicate one of the aforementioned periods.

Figure 7:
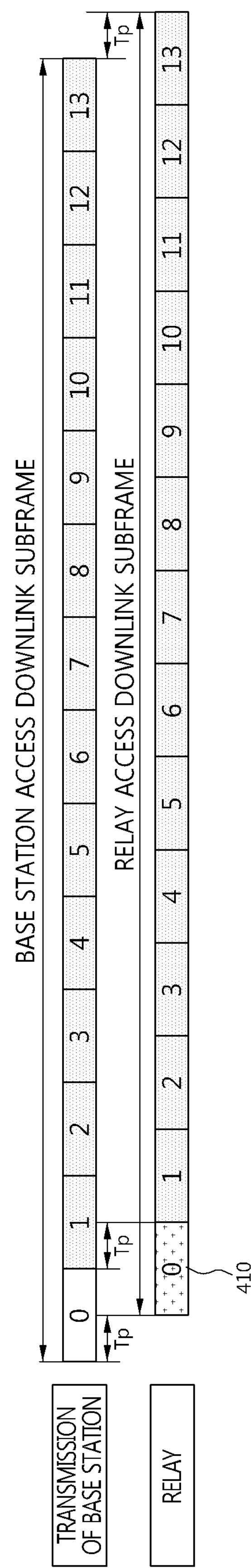
FIG. 7 illustrates a relationship between transmission and reception of a backhaul downlink signal between a base station and a relay based on a downlink transmission method according to yet another exemplary embodiment of the present invention.

FIG. 7 illustrates a relationship between transmission and reception of a backhaul downlink signal between a base station and a relay based on a downlink transmission method according to yet another exemplary embodiment of the present invention.

Like FIGS. 4 to 6, FIG. 7 illustrates frame structures of a base station and a relay on the assumption that k=1 and L=14.

The exemplary embodiment of FIG. 7 is different from the foregoing exemplary embodiments in that it is assumed that a time for switching from downlink transmission to downlink reception at the RF terminal of the relay and a time for switching from downlink reception to downlink transmission at the RF terminal of the relay are each much less than the cyclic prefix of a symbol. In this case, the guard periods GP1_DL and GP2_DL are each included in the cyclic prefix of a symbol, and thus are not shown in FIG. 7.

In the exemplary embodiment of FIG. 7, the relay sets the start time point of a relay access downlink subframe to be a point in time when the relay begins to receive the first symbol of a base station access downlink subframe. In this case, the base station can transmit a backhaul downlink signal through symbol k to the last symbol of the base station access downlink subframe. The relay can receive the backhaul downlink signal through symbol k to the last symbol of the base station access downlink subframe.

As described above, the first symbol of a backhaul downlink signal that can be exchanged between a base station and a relay varies according to the number k of symbols through which a relay access downlink physical control channel of a relay access downlink signal is transmitted. Also, the first symbol of a backhaul downlink signal that can be exchanged between a base station and a relay may vary according to the number of symbols through which a base station access downlink physical control channel of a base station access downlink signal is transmitted. In this case, the base station may notify the relay of the position information of the first symbol of the backhaul downlink signal. The position information of the first symbol of the backhaul downlink signal can be transferred by upper layer signaling (RRC signaling in the case of 3GPP) or through a backhaul downlink physical control channel.

Thus far, backhaul downlink transmission methods according to exemplary embodiments of the present invention have been described.

Uplink transmission methods according to exemplary embodiments of the present invention will be described below. First, backhaul/base station access/relay access uplink subframes to which an exemplary embodiment of the present invention is applied will be described.

A base station access uplink frame consists of a plurality of base station access uplink subframes. According to a base station access uplink subframe, a base station may receive a base station access uplink signal alone or a backhaul uplink signal alone. Also, the base station may receive a base station access uplink signal and a backhaul uplink signal together. In this case, the base station access uplink signal and the backhaul uplink signal can be received in different regions. Here, a region denotes a combination of a time domain, frequency domain, spatial domain, code domain, and so on. A base station access uplink signal includes a base station access uplink physical data channel, a base station access uplink physical control channel, a base station access uplink demodulation reference signal, a base station access uplink channel measurement reference signal, and so on. Also, the base station access uplink signal may further include other signals in addition to the aforementioned signals.

Meanwhile, a relay uplink frame consists of a plurality of relay uplink subframes. A relay uplink subframe may be a relay access uplink subframe or a backhaul uplink subframe. A relay can receive a relay access uplink signal through a relay access uplink subframe in the base station mode of relay. The relay access uplink signal includes a relay access uplink physical data channel, a relay access uplink physical control channel, a relay access uplink demodulation reference signal, and a relay access uplink channel measurement reference signal. The relay access uplink signal may further include other signals in addition to the aforementioned signals or channels.

Also, the relay may transmit a backhaul uplink signal in a backhaul uplink subframe. The backhaul uplink signal includes a backhaul uplink physical data channel, a backhaul uplink physical control channel, a backhaul uplink demodulation reference signal, and a backhaul uplink channel measurement reference signal. Also, the backhaul uplink signal may further include other signals in addition to the aforementioned signals or channels.

A relay can put a guard period before and after transmission of a backhaul uplink signal to switch between uplink transmission and uplink reception performed at the RF terminal of the relay. During this guard period, the relay neither transmits a backhaul uplink signal nor receives a relay access uplink signal. A guard period from when the relay receives a relay access uplink signal to when the relay transmits a backhaul uplink signal is referred to as a preceding guard period GP1_UL, and the length of GP1_UL is indicated by Tgp1_UL. Tgp1_UL should be equal to or greater than a time for switching from uplink reception to uplink transmission at the RF terminal of the relay. A guard period from when the relay transmits a backhaul uplink signal to when the relay receives a relay access uplink signal is referred to as a following guard period GP2_UL, and the length of GP2_UL is indicated by Tgp2_UL. Tgp2_UL should be equal to or greater than a time for switching from uplink transmission to uplink reception at the RF terminal of the relay. The guard periods GP1_UL and GP2_UL can be disposed in a backhaul uplink subframe.

Next, backhaul uplink timing alignment, that is, timing between uplink transmission of a relay and uplink reception of a base station will be described below.

Figure 8:
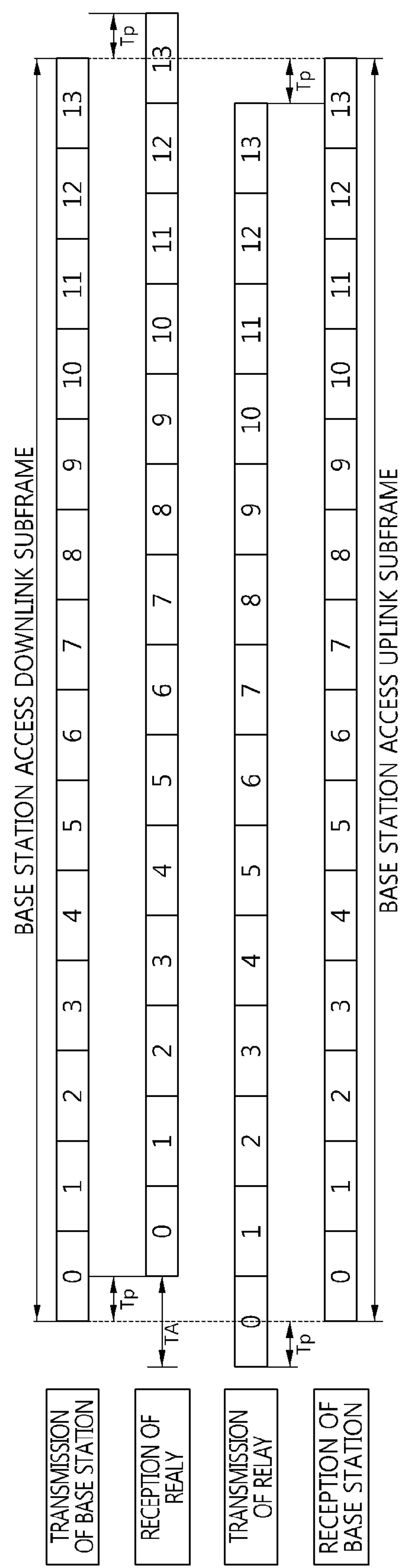
FIG. 8 illustrates a relationship between transmission and reception of a base station access uplink signal between a base station and a relay.

FIG. 8 illustrates a relationship between transmission and reception of a base station access uplink signal between a base station and a relay.

In FIG. 8, two upper downlink subframe structures are related to transmission of a base station and the consequent reception of a relay, and two lower uplink subframe structures are related to transmission of a relay and the consequent reception of a base station.

In FIG. 8, TA denotes a time indicated by timing advance information. Here, the time TA indicated by timing advance information is assumed to be 2×Tp. Also, it is assumed that a point in time when a base station begins to transmit a base station access downlink subframe is the same as a point in time when the base station begins to receive a base station access uplink subframe.

In the UE mode of relay, a relay transmits a base station access uplink signal to a base station. The relay begins to transmit a base station access uplink signal earlier than a point in time when the relay begins to receive a base station access downlink signal by a time indicated by timing advance information transferred by the base station to the relay. The base station access uplink signal arrives at the base station after Tp. This timing relationship can be seen in FIG. 8.

In the base station mode of relay, the period of a backhaul downlink signal that can be exchanged between a base station and a relay may vary according to the lengths Tgp1_UL and Tgp2_UL of guard periods, a time required for switching between uplink transmission and uplink reception at the RF terminal of the relay, and the start time point of a backhaul uplink subframe or a relay access uplink subframe.

The present invention suggests some methods related to constitution of a backhaul uplink signal that can be exchanged between a base station and a relay, and these methods will be described with reference to exemplary embodiments below.

In a detailed constitution, the following are assumed. A base station access uplink subframe consists of R symbols, and the serial numbers of the symbols begin with 0. Thus, symbol p denotes a (p+1)th symbol of a base station access uplink subframe. Also, a backhaul uplink subframe consists of a plurality of symbols. In the backhaul uplink subframe, the serial numbers of backhaul uplink signal symbols are given in terms of the instance that a backhaul uplink signal is received in a base station access uplink subframe. For example, backhaul uplink signal symbol p transmitted by the relay is received by the base station at symbol p of the base station access uplink subframe. The backhaul uplink signal transmitted by the relay is received by the base station after Tp. The length of a base station access uplink subframe is the same as that of a backhaul uplink subframe.

With reference to FIGS. 9 to 12, backhaul uplink transmission methods according to exemplary embodiments of the present invention will be described below.

Figure 9:
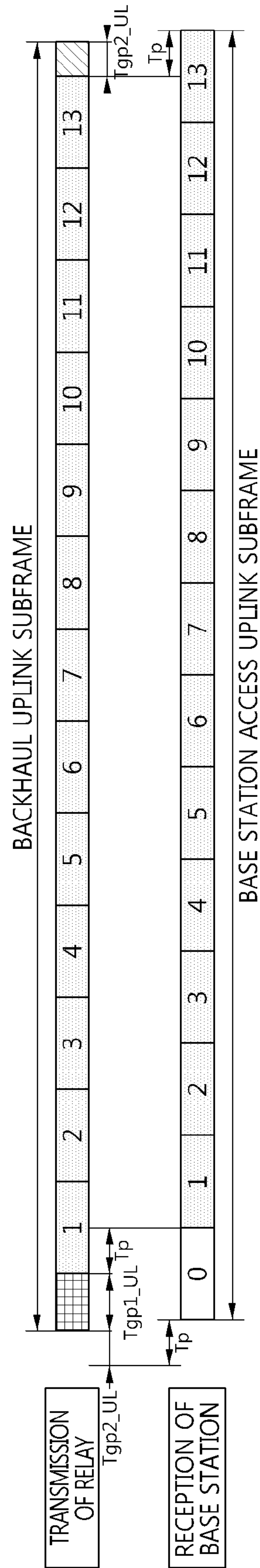
FIG. 9 illustrates a relationship between transmission and reception of a backhaul uplink signal between a base station and a relay based on a backhaul uplink transmission method according to an exemplary embodiment of the present invention.

FIG. 9 illustrates a relationship between transmission and reception of a backhaul uplink signal between a base station and a relay based on a backhaul uplink transmission method according to an exemplary embodiment of the present invention.

In the exemplary embodiment of FIG. 9, it is assumed that R=14. Also, it is assumed that a time for switching from uplink transmission to uplink reception at the RF terminal of the relay and a time for switching from uplink reception to uplink transmission are each greater than the cyclic prefix of a symbol.

In the exemplary embodiment shown in FIG. 9, a relay sets the start time point of a backhaul uplink subframe to be later than a point in time when the relay transmits a base station access uplink signal in the UE mode of relay by Tgp2_UL. In this case, the base station can receive a backhaul uplink signal through the second symbol to the last symbol of the base station access uplink subframe. The relay can transmit the backhaul uplink signal through the second symbol to the last symbol of the backhaul uplink subframe. The relay can begin to transmit the backhaul uplink signal at a point in time later than the point in time when the relay transmits the base station access uplink signal in the UE mode of relay by the length of one symbol. Alternatively, the relay may begin to transmit the backhaul uplink signal at a point in time later than the start time point of the backhaul uplink subframe by Tgp1_UL, as shown in FIG. 9. Here, it is assumed that the sum of Tgp1_UL and Tgp2_UL is the same as the length of one symbol.

The start time point of a backhaul uplink subframe and the transmission start time point of a backhaul uplink signal mentioned above can be applied at least when the relay switches from the UE mode of relay to the base station mode of relay. After the relay switches to the base station mode of relay, the start time point of a backhaul uplink subframe and the transmission start time point of a backhaul uplink signal may each vary according to timing advance information transmitted by the base station to the relay.

Figure 10:
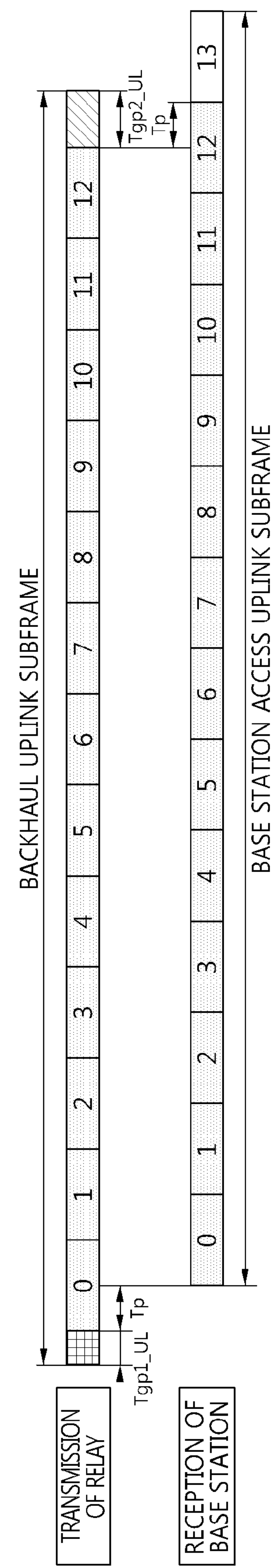
FIG. 10 illustrates a relationship between transmission and reception of a backhaul uplink signal between a base station and a relay based on a backhaul uplink transmission method according to another exemplary embodiment of the present invention.

FIG. 10 illustrates a relationship between transmission and reception of a backhaul uplink signal between a base station and a relay based on a backhaul uplink transmission method according to another exemplary embodiment of the present invention.

Like in FIG. 9, it is assumed in the exemplary embodiment of FIG. 10 that R=14. Also, it is assumed that a time for switching from uplink transmission to uplink reception at the RF terminal of a relay and a time for switching from uplink reception to uplink transmission are each greater than the cyclic prefix of a symbol.

In the exemplary embodiment shown in FIG. 10, a relay sets the start time point of a backhaul uplink subframe to be earlier than a point in time when the relay transmits a base station access uplink signal in the UE mode of relay by Tgp1_UL. In this case, the base station can receive a backhaul uplink signal through the first symbol to the second to last symbol of a base station access uplink subframe. The relay can transmit the backhaul uplink signal through the first symbol to the second to last symbol of the backhaul uplink subframe.

The relay can begin to transmit the backhaul uplink signal at a point in time when the relay begins to transmit the base station access uplink signal in the UE mode of relay. Alternatively, the relay may begin to transmit the backhaul uplink signal at a point in time later than the start time point of the backhaul uplink subframe by Tgp1_UL, as shown in FIG. 10.

The start time point of a backhaul uplink subframe and the transmission start time point of a backhaul uplink signal mentioned above can be applied at least when the relay switches from the UE mode of relay to the base station mode of relay. After the relay switches to the base station mode of relay, the start time point of a backhaul uplink subframe and the transmission start time point of a backhaul uplink signal may each vary according to timing advance information transmitted by the base station to the relay.

Figure 11:
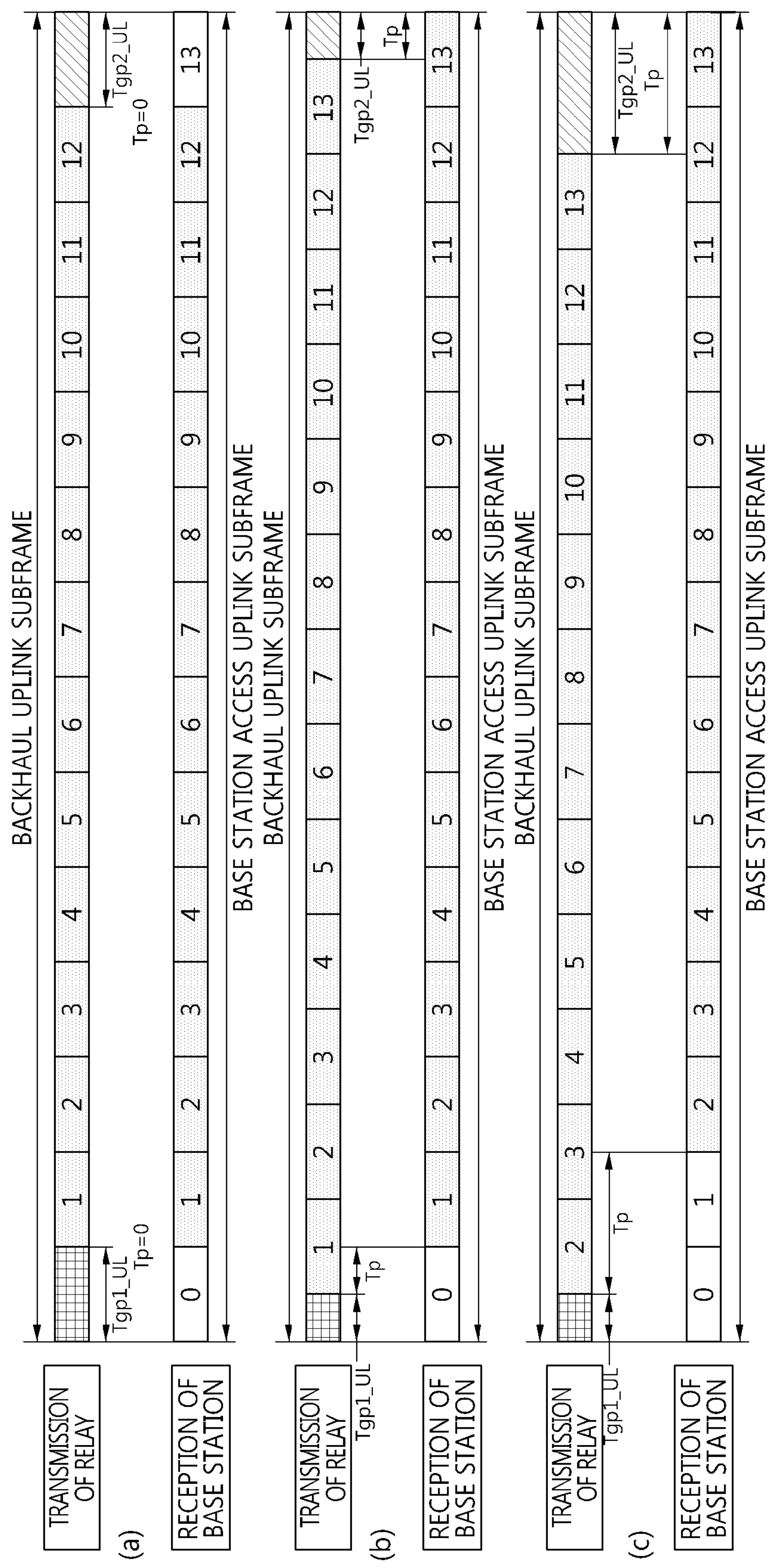
FIG. 11 illustrates a relationship between transmission and reception of a backhaul uplink signal between a base station and a relay based on a backhaul uplink transmission method according to still another exemplary embodiment of the present invention.

FIG. 11 illustrates a relationship between transmission and reception of a backhaul uplink signal between a base station and a relay based on a backhaul uplink transmission method according to still another exemplary embodiment of the present invention.

Like in FIGS. 9 and 10, it is assumed in the exemplary embodiment of FIG. 11 that R=14. Also, it is assumed that a time for switching from uplink transmission to uplink reception at the RF terminal of a relay and a time for switching from uplink reception to uplink transmission are each greater than the cyclic prefix of a symbol.

In the exemplary embodiment of FIG. 11, the start time point of a backhaul uplink subframe is set to be the same as that of a base station access uplink subframe. In this case, FIGS. 11(A) to 11(C) illustrate a change in the period of a backhaul uplink signal exchanged between a base station and a relay according to Tp. FIG. 11(A) illustrates a case in which Tp is equal to 0, FIG. 11(B) illustrates a case in which Tp is a positive real number, and FIG. 11(C) illustrates a case in which Tp is greater than that of FIG. 11(B). Referring to FIGS. 11(A) to 11(C) in further detail, in FIG. 11(A) where Tp is 0, the period of a backhaul uplink signal ranges from symbol 1 to symbol 12. In FIG. 11(B) where Tp is a positive real number, the period of a backhaul uplink signal ranges from symbol 1 to symbol 13, and in FIG. 11(C) where Tp is greater than that of FIG. 11(B), a backhaul uplink signal period ranges from symbol 2 to symbol 13. According to Tp, a backhaul uplink signal period may range from symbol 3 to symbol 13, symbol 4 to symbol 13, or so on. Backhaul uplink signal period information can indicate one of the aforementioned periods.

In the exemplary embodiment of FIG. 11, the base station can receive a backhaul uplink signal through symbol p to symbol q of a base station access uplink subframe. The relay can transmit the backhaul uplink signal through symbol p to symbol q of a backhaul uplink subframe. Here, $p \geq 1$, and $q \leq R-1$. In other words, the relay transmits a backhaul uplink signal using symbols for backhaul uplink signal transmission including the second symbol of a base station access uplink subframe to the last symbol as maximum. Here, it can be seen from FIG. 11 that the start symbol and the end symbol among the symbols for backhaul uplink signal transmission may vary according to at least one of the length of the signal transmission time of a backhaul uplink and a time for the relay to switch between transmission and reception.

Also, in the exemplary embodiment of FIG. 11, the relay sets the start time point of a backhaul uplink subframe to be similar to the start time point of a base station access uplink subframe. To this end, the relay sets the start time point of a backhaul uplink subframe to be later than a point in time when the relay begins to transmit a base station access uplink signal by half a time indicated by timing advance information transmitted by the base station to the relay. In this way, the start time point of a backhaul uplink subframe can be almost the same as the start time point of a base station access uplink subframe. The relay may begin to transmit a backhaul uplink signal later than the start time point of a backhaul uplink subframe by Tgp1_UL. According to Tp, the lengths of guard periods Tgp1_UL and Tgp2_UL may vary, and also the period of a backhaul uplink signal that can be exchanged between the relay and the base station may vary. Tp can vary according to the location where the relay is deployed.

Here, the base station can transmit information about the period of a backhaul uplink signal that will be transmitted by the relay to the relay by upper layer signaling (RRC signaling in the case of 3GPP). As an exemplary embodiment of the information about the period of a backhaul uplink signal, the respective indices of the first symbol and the last symbol of the backhaul uplink signal can be known.

As another exemplary embodiment of the period information of a backhaul uplink signal, the periods of a plurality of backhaul uplink signals may be determined in advance, and one of the periods may be known. The relay transmits a backhaul uplink signal on the basis of the backhaul uplink signal period information received from the base station.

The start time point of a backhaul uplink subframe and the transmission start time point of a backhaul uplink signal mentioned above can be applied at least when the relay switches from the UE mode of relay to the base station mode of relay. After the relay switches to the base station mode of relay, the start time point of a backhaul uplink subframe and the transmission start time point of a backhaul uplink signal may each vary according to timing advance information transmitted by the base station to the relay.

Figure 12:
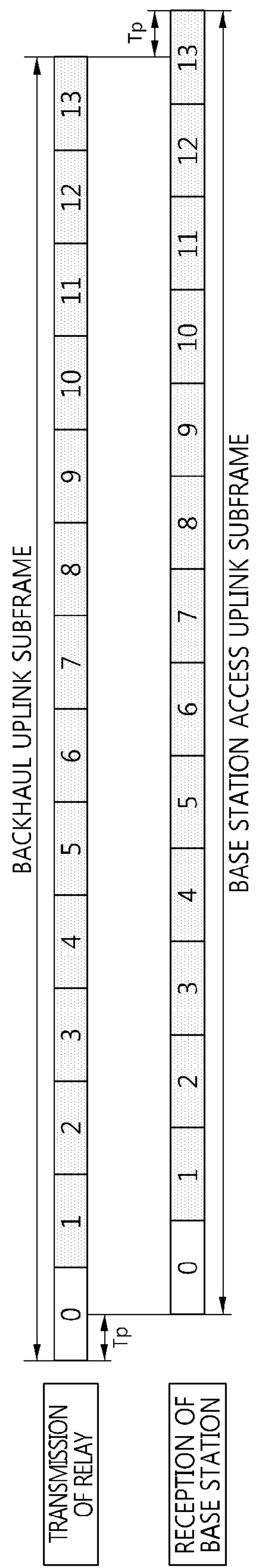
FIG. 12 illustrates a relationship between transmission and reception of a backhaul uplink signal between a base station and a relay based on a backhaul uplink transmission method according to yet another exemplary embodiment of the present invention.

FIG. 12 illustrates a relationship between transmission and reception of a backhaul uplink signal between a base station and a relay based on a backhaul uplink transmission method according to yet another exemplary embodiment of the present invention.

In the exemplary embodiment of FIG. 12, it is also assumed that R=14. Meanwhile, the exemplary embodiment of FIG. 12 is different from other exemplary embodiments in that it is assumed that a time for switching from uplink transmission to uplink reception at the RF terminal of a relay and a time for switching from uplink reception to uplink transmission at the RF terminal of the relay are each much less than the cyclic prefix of a symbol. In this case, the guard periods GP 1_UL and GP2_UL are each included in the cyclic prefix of a symbol, and thus are not shown in FIG. 12.

In the exemplary embodiment of FIG. 12, the relay sets the start time point of a backhaul uplink subframe to be a point in time when the relay transmits a base station access uplink signal in the UE mode of relay. In this case, a base station can receive a backhaul uplink signal through the first symbol to the last symbol of a base station access uplink subframe. The relay can transmit the backhaul uplink signal through the first symbol to the last symbol of the backhaul uplink subframe. The relay can begin to transmit the backhaul uplink signal at the start time point of the backhaul uplink subframe.

The start time point of a backhaul uplink subframe and the transmission start time point of a backhaul uplink signal mentioned above can be applied at least when the relay switches from the UE mode of relay to the base station mode of relay. After the relay switches to the base station mode of relay, the start time point of a backhaul uplink subframe and the transmission start time point of a backhaul uplink signal may each vary according to timing advance information transmitted by the base station to the relay.

Thus far, backhaul uplink transmission methods according to exemplary embodiments of the present invention have been described.

Next, downlink and uplink configurations will be described below.

In relation to downlink and uplink transmission timings described above, a relay can transmit information about a time for switching between transmission and reception at the RF terminal of the relay to a base station by upper layer signaling (RRC signaling in the case of 3GPP). The time for switching between transmission and reception at the RF terminal of the relay includes, for example, a time for switching from downlink transmission to downlink reception, a time for switching from downlink reception to downlink transmission, a time for switching from uplink transmission to uplink reception, a time for switching from uplink reception to uplink transmission, etc. at the RF terminal of the relay. Using this information, the base station can determine the period configuration information of a backhaul downlink signal that can be exchanged with the relay, the period configuration information of a backhaul uplink signal that can be exchanged with the relay, and so on.

In relation to a backhaul downlink, a base station may notify a relay of the period configuration information of a backhaul downlink signal by upper layer signaling (RRC signaling may be used in the case of 3GPP), and the base station and the relay may selectively use one or more of a plurality of backhaul downlink signal period configurations to exchange a backhaul downlink signal. Here, selection of a backhaul downlink signal period configuration may vary according to the deployment method of the relay or time. Every time selection of a backhaul downlink signal period configuration varies, the base station transmits period configuration information of the backhaul downlink signal to the relay. Here, the period configuration information of the backhaul downlink signal indicates the configurations shown in the exemplary embodiments of FIGS. 3 to 7, that is, information about symbols of a whole base station access downlink subframe through which the signal is actually transmitted and information about backhaul downlink transmission timings of the base station and the relay.

Alternatively, the base station may not notify the relay of the period configuration information of a backhaul downlink signal, and the base station and the relay may exchange a backhaul downlink signal using one or more predefined backhaul downlink signal period configurations.

In relation to a backhaul uplink, a base station may notify a relay of the period configuration information of a backhaul uplink signal by upper layer signaling (RRC signaling may be used in the case of 3GPP), and the base station and the relay may selectively use one or more of a plurality of backhaul uplink signal period configurations to exchange a backhaul uplink signal. Here, selection of a backhaul uplink signal period configuration may vary according to the deployment method of the relay or time. Every time selection of a backhaul uplink signal period configuration varies, the base station transmits period configuration information of the backhaul uplink signal to the relay. Here, the period configuration information of the backhaul uplink signal indicates the configurations shown in the exemplary embodiments of FIGS. 9 to 12, that is, information about symbols of a whole backhaul uplink subframe through which the signal is actually transmitted and information about a backhaul uplink transmission timing of the relay and a backhaul uplink reception timing of the base station.

Alternatively, the base station may not notify the relay of the period configuration information of a backhaul uplink signal, and the relay and the base station may exchange a backhaul uplink signal using one or more predefined backhaul downlink signal period configurations.

Meanwhile, the relay can configure a relay access uplink subframe as a relay access uplink channel measurement subframe to receive a relay access uplink channel measurement reference signal from a relay UE. From a specific symbol of a relay access uplink channel measurement subframe, the relay can receive a relay access uplink channel measurement reference signal transmitted by a relay UE. The whole or a part of a relay access uplink subframe may be configured as a relay access uplink channel measurement subframe. Configuration information of such a relay access uplink channel measurement subframe may be determined by the relay and transmitted to the base station by upper layer signaling (RRC signaling may be used in the case of 3GPP), or determined by the base station and transmitted to the relay by upper layer signaling (RRC signaling may be used in the case of 3GPP).

Figure 13:
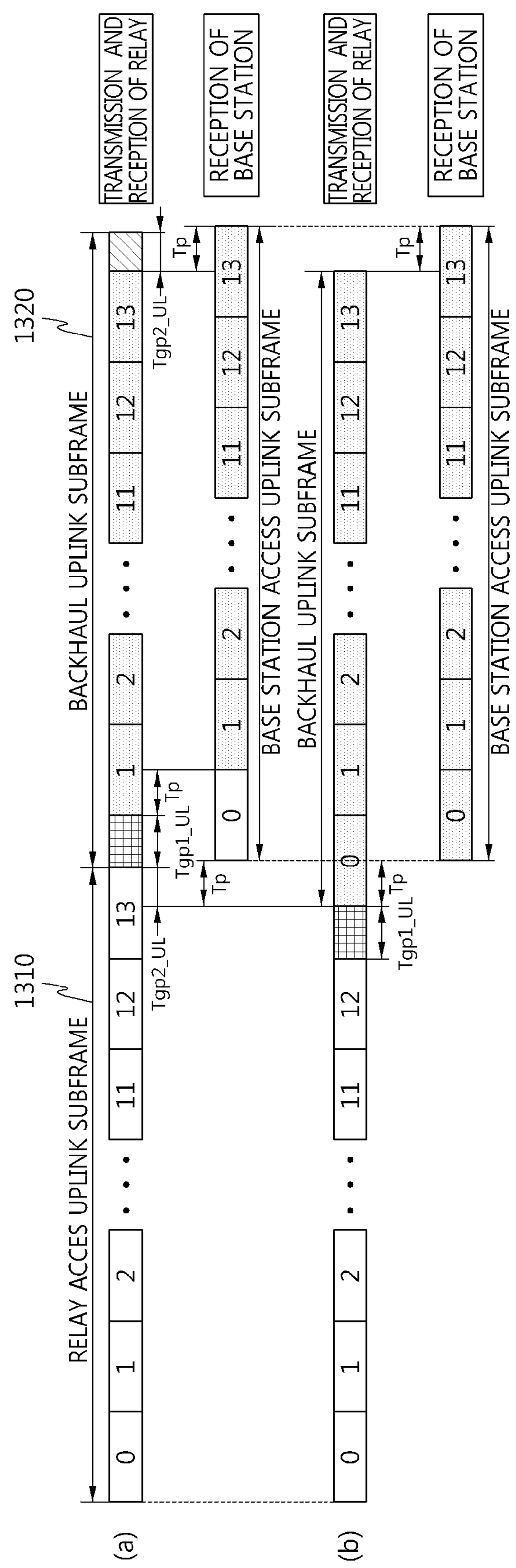
FIG. 13 illustrates frame structures of a relay and a base station when two different uplink timing configurations are simultaneously used on the basis of an uplink configuration method according to an exemplary embodiment of the present invention.

When the relay transmits a backhaul uplink subframe, the period of the backhaul uplink subframe transmitted by the relay may vary according to whether or not a relay access uplink subframe immediately ahead of or behind the backhaul uplink subframe is a relay access uplink channel measurement subframe, which can be seen in the exemplary embodiment of FIG. 13.

FIG. 13 illustrates frame structures of a relay and a base station when two different uplink timing configurations are simultaneously used on the basis of an uplink configuration method according to an exemplary embodiment of the present invention.

Here, GP 1_UL and GP2_UL indicate an uplink preceding guard period and uplink following guard period respectively, and the lengths of the respective guard periods are Tgp1_UL and Tgp2_UL. Also, Tp indicates a signal transmission time between a base station and a relay. It is assumed that each of a relay access uplink subframe 1310 and a backhaul uplink subframe 1320 consists of 14 symbols. Also, it is assumed that a time for switching from uplink transmission to uplink reception at the RF terminal of a relay and a time for switching from uplink reception to uplink transmission at the RF terminal of a relay are each greater than the cyclic prefix of a symbol.

FIG. 13(A) illustrates a case in which the relay access uplink subframe 1310 is not a relay access uplink channel measurement subframe. In this case, a base station can receive a backhaul uplink signal through the second symbol to the last symbol of a base station access uplink subframe, like in the above described uplink transmission method of FIG. 9 according to an exemplary embodiment of the present invention. A relay can transmit the backhaul uplink signal through the second symbol to the last symbol of the backhaul uplink subframe 1320.

Meanwhile, FIG. 13(B) illustrates a case in which a relay access uplink subframe is a relay access uplink channel measurement subframe. Here, the relay may not receive the last symbol of the relay access uplink subframe. Like in the above described uplink transmission method of FIG. 12 according to an exemplary embodiment of the present invention, a base station can receive a backhaul uplink signal through the first symbol to the last symbol of a base station access uplink subframe. The relay can transmit the backhaul uplink signal through the first symbol to the last symbol of a backhaul uplink subframe.

Referring to FIGS. 13(A) and 13(B), it can be seen that a relay receives relay access uplink subframes at the same point in time. Also, although periods allocated to backhaul uplink signals are different from each other in FIGS. 13(A) and 13(B), a base station receives symbol 1 to symbol 13 of the back uplink signals at the same point in time. In other words, the number of backhaul uplink signal symbols transmitted by the relay may vary, for example, may be 13 or 14, but the relay transmits the backhaul uplink signal symbols at the same point in time. Thus, in the respective cases of FIGS. 13(A) and 13(B), the base station does not need to transmit different pieces of timing advance information to the relay. In the case of FIG. 13(A), the relay begins to transmit the backhaul uplink signal later than a reference point in time by one symbol, and in the case of FIG. 13(B), the relay begins to transmit the backhaul uplink signal at the reference point in time. Here, the reference point in time can be the start time point of the backhaul uplink subframe in FIG. 13(B).

In brief, in a backhaul downlink between a base station and a relay according to an aspect of the present invention, the base station and the relay exchange a backhaul downlink signal using period configuration information of the backhaul downlink signal or information about the period of the backhaul downlink signal. Also, in a backhaul uplink between a base station and a relay according to an exemplary embodiment of the present invention, the base station and the relay exchange a backhaul uplink signal using period configuration information of the backhaul uplink signal or information about the period of the backhaul uplink signal.

Backhaul uplink transmission according to another aspect of the present invention will be described below.

A backhaul uplink subframe may consist of a backhaul uplink signal period and a guard period. A backhaul uplink signal includes a backhaul uplink physical data channel, a backhaul uplink physical control channel, a backhaul uplink demodulation reference signal, a backhaul uplink channel measurement reference signal, and so on. Also, the backhaul uplink signal may further include other signals in addition to the aforementioned signals.

Due to a signal transmission time between a base station and a relay, a time for switching between backhaul uplink transmission and relay access uplink reception at the RF terminal of the relay, etc., a guard period can be put in the front portion, the rear portion, or the front and rear portions of a backhaul uplink subframe. The length of the guard period is not limited, and the lengths of the guard periods in the front and rear portions may be the same as or different from each other.

The relay 210 performing uplink transmission according to an exemplary embodiment of the present invention configures an uplink frame to have one backhaul uplink subframe in which a first backhaul uplink demodulation reference signal and a second backhaul uplink demodulation reference signal are disposed. Alternatively, the relay 210 may configure an uplink frame to have one backhaul uplink subframe in which only one backhaul uplink demodulation reference signal is disposed. When two or more backhaul uplink subframes to be transmitted by the relay 210 to a base station are consecutively disposed, the relay 210 according to an exemplary embodiment of the present invention replaces a guard period disposed at a position where one of the backhaul uplink subframes is in contact with the other backhaul uplink subframe with a backhaul uplink signal period to adaptively configure a backhaul uplink subframe.

A base station 110 according to an exemplary embodiment of the present invention can transmit information about the format of a separate backhaul uplink subframe to be used by a relay to the relay in advance. The base station 110 receives two or more consecutive backhaul uplink subframes from the relay, and infers the format of the two or more consecutive backhaul uplink subframes from the format of the predefined separate backhaul uplink subframe.

Figure 14:
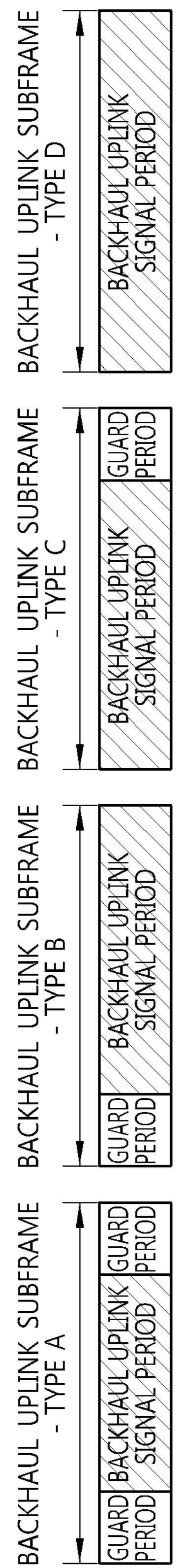
FIG. 14 illustrates several formats of a backhaul uplink subframe according to exemplary embodiments of the present invention.

FIG. 14 illustrates several formats of a backhaul uplink subframe according to exemplary embodiments of the present invention.

Referring to the backhaul uplink subframe formats shown in FIG. 14, a subframe can be configured according to whether or not a guard period exists and disposition of a guard period as type A in which guard periods are disposed on both sides of a backhaul uplink signal period, type B in which a guard period is only disposed ahead of a backhaul uplink signal period, type C in which a guard period is only disposed behind a backhaul uplink signal period, and type D in which no guard period but only a backhaul uplink signal period exists. Here, a guard period disposed ahead of a signal period is referred to as a preceding guard period, and a guard period disposed behind a signal period is referred to as a following guard period.

A base station and a relay can perform backhaul uplink transmission and reception using a backhaul uplink subframe of a fixed format or a predefined format. Alternatively, the several subframe configuration types shown in FIG. 14 may be defined, and then a specific type may be selected by signaling and used according to circumstances. In this case, the base station can transmit format information of a backhaul uplink subframe that will be used by the relay when one separate backhaul uplink subframe is allocated to the relay. Here, the format information of a separate backhaul uplink subframe can indicate, for example, which one among type A, type B, type C and type D that are backhaul uplink subframe formats shown in FIG. 14 will be used. In other words, the base station can select one of at least one backhaul uplink subframe format predefined between the base station and the relay and transmit information about the selected subframe format to the relay by upper layer signaling (RRC signaling may be used in the case of 3GPP).

Meanwhile, the base station may allocate backhaul uplink subframes that are consecutive in time to the relay. In this case, the relay transmits the backhaul uplink subframes that are consecutive in time. At this time, the following guard period of the first backhaul uplink subframe, and the preceding guard period of the next backhaul uplink subframe may be unnecessary. Thus, when the base station allocates base station uplink subframes that are consecutive in time to the relay, the relay adaptively changes the format of a backhaul uplink subframe and transmits the backhaul uplink subframe. In this specification, the adaptively changed format of a backhaul uplink subframe will be referred to as "adaptive backhaul uplink subframe format."

FIGS. 15 to 18 illustrate the format of a backhaul uplink subframe varying depending on a change in the number of backhaul uplink subframes to be consecutively transmitted according to exemplary embodiments of the present invention.

When a relay transmits a separate backhaul uplink subframe, the format of the backhaul uplink subframe may be one of type A, type B, type C and type D shown in FIG. 14. Here, "transmission of a separate backhaul uplink subframe" indicates a case in which one backhaul uplink subframe is not transmitted immediately before and after the other backhaul uplink subframe is transmitted.

Figure 15:
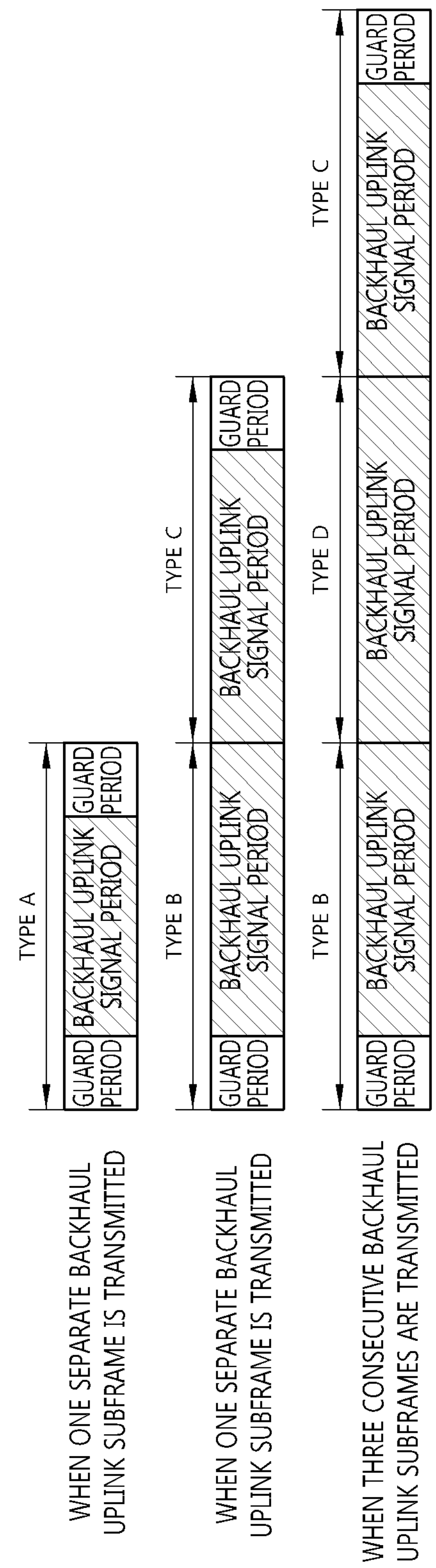
FIG. 15 illustrates formats of consecutive backhaul uplink subframes when a separate backhaul uplink subframe corresponds to type A of FIG. 14.

FIG. 15 illustrates formats of consecutive backhaul uplink subframes when a separate backhaul uplink subframe corresponds to type A of FIG. 14.

FIG. 15 shows the format of a backhaul uplink subframe according to the number of consecutively transmitted backhaul uplink subframes when the subframe requires guard periods in the front portion and the rear portion as type A. In other words, when two consecutive backhaul uplink subframes are transmitted, the backhaul uplink subframes are transmitted in the formats of type B and type C in sequence. When N consecutive backhaul uplink subframes are transmitted, the foremost and rearmost backhaul uplink subframes are transmitted in the formats of type B and type C respectively, and N−2 backhaul uplink subframes between the foremost and rearmost backhaul uplink subframes are transmitted in the format of type D.

Figure 16:
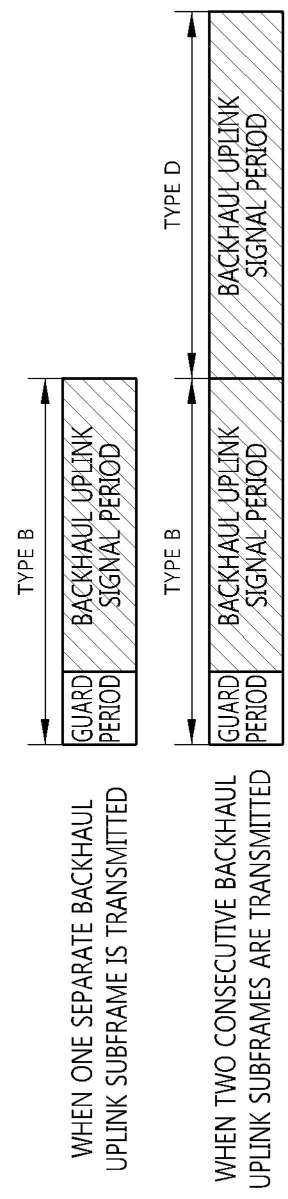
FIG. 16 illustrates formats of consecutive backhaul uplink subframes when a separate backhaul uplink subframe corresponds to type B of FIG. 14.

FIG. 16 illustrates formats of consecutive backhaul uplink subframes when a separate backhaul uplink subframe corresponds to type B of FIG. 14.

It is possible to check in FIG. 16 the format of a backhaul uplink subframe according to the number of consecutively transmitted backhaul uplink subframes when one separate backhaul uplink subframe transmitted by a relay requires a guard period in the front portion as type B. When N consecutive backhaul uplink subframes are transmitted, the foremost backhaul uplink subframe is transmitted in the format of type B, and the following N−1 backhaul uplink subframes are transmitted in the format of type D.

Figure 17:
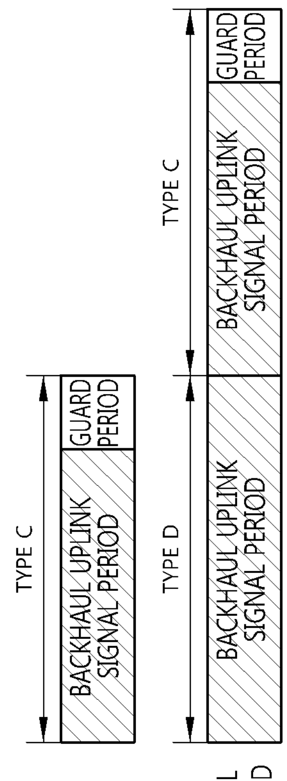
FIG. 17 illustrates formats of consecutive backhaul uplink subframes when a separate backhaul uplink subframe corresponds to type C of FIG. 14.

FIG. 17 illustrates formats of consecutive backhaul uplink subframes when a separate backhaul uplink subframe corresponds to type C of FIG. 14.

In other words, FIG. 17 shows the format of a backhaul uplink subframe according to the number of consecutively transmitted backhaul uplink subframes when one separate backhaul uplink subframe transmitted by a relay requires a guard period in the rear portion as type C. When N consecutive backhaul uplink subframes are transmitted, the rearmost backhaul uplink subframe is transmitted in the format of type C, and the preceding N−1 backhaul uplink subframes are transmitted in the format of type D.

Figure 18:
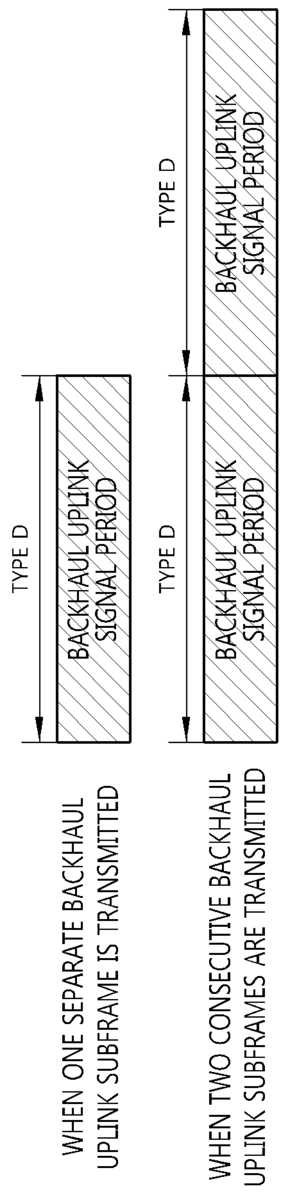
FIG. 18 illustrates formats of consecutive backhaul uplink subframes when a separate backhaul uplink subframe corresponds to type D of FIG. 14.

FIG. 18 illustrates formats of consecutive backhaul uplink subframes when a separate backhaul uplink subframe corresponds to type D of FIG. 14.

When one separate backhaul uplink subframe transmitted by a relay requires no guard period as type D, all backhaul uplink subframes are transmitted in the format of type D regardless of the number of consecutively transmitted backhaul uplink subframes, as shown in FIG. 18.

In brief, when two or more backhaul uplink subframes to be transmitted by a relay to a base station are consecutively disposed in the exemplary embodiments of FIGS. 15 to 18, a guard period disposed at a position where one backhaul uplink subframe is in contact with another backhaul uplink subframe is replaced with a backhaul uplink signal period to adaptively configure a backhaul uplink subframe.

Also, even if a relay does not notify a base station of the format of a backhaul uplink subframe transmitted by the relay itself, the base station can tacitly know the format of a backhaul uplink subframe transmitted by the relay when the base station allocates backhaul uplink subframes that are consecutive in time to the relay. In other words, when the base station receives two or more consecutive backhaul uplink subframes from the relay, the base station can infer the formats of the two or more consecutive backhaul uplink subframes from the format of a predefined separate backhaul uplink subframe.

The internal constitution of a backhaul uplink subframe will be described below.

When a relay transmits backhaul uplink physical data, a backhaul uplink subframe may consist of a symbol through which the backhaul uplink physical data is transmitted, a symbol through which a backhaul uplink demodulation reference signal is transmitted, and a guard period. Here, the guard period can be disposed in the front portion, the rear portion, or the front and rear portions of the backhaul uplink subframe, and the lengths of the preceding and following guard periods may be the same as or different from each other.

FIGS. 19 to 22 illustrate backhaul uplink subframe structures according to exemplary embodiments of the present invention.

Here, it is possible to check a change in the structure of a backhaul uplink subframe according to the number of symbols constituting the backhaul uplink subframe, the number of symbols through which backhaul uplink physical data is transmitted, the number of symbols through which a backhaul uplink demodulation reference signal is transmitted, and a change in the length of a guard period.

Figure 19:
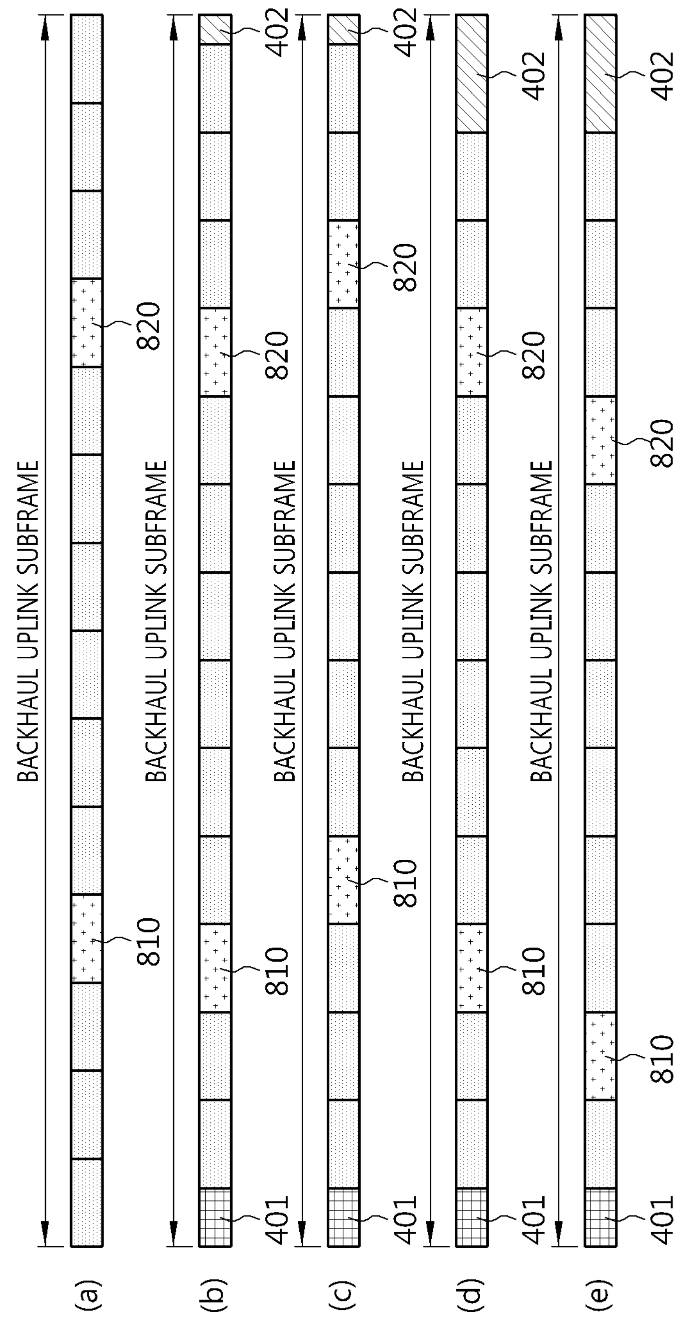
FIG. 19 illustrates frame structures according to exemplary embodiments of the present invention when two backhaul uplink demodulation reference signals are present in a backhaul uplink subframe including 14 symbols.
Figure 20:
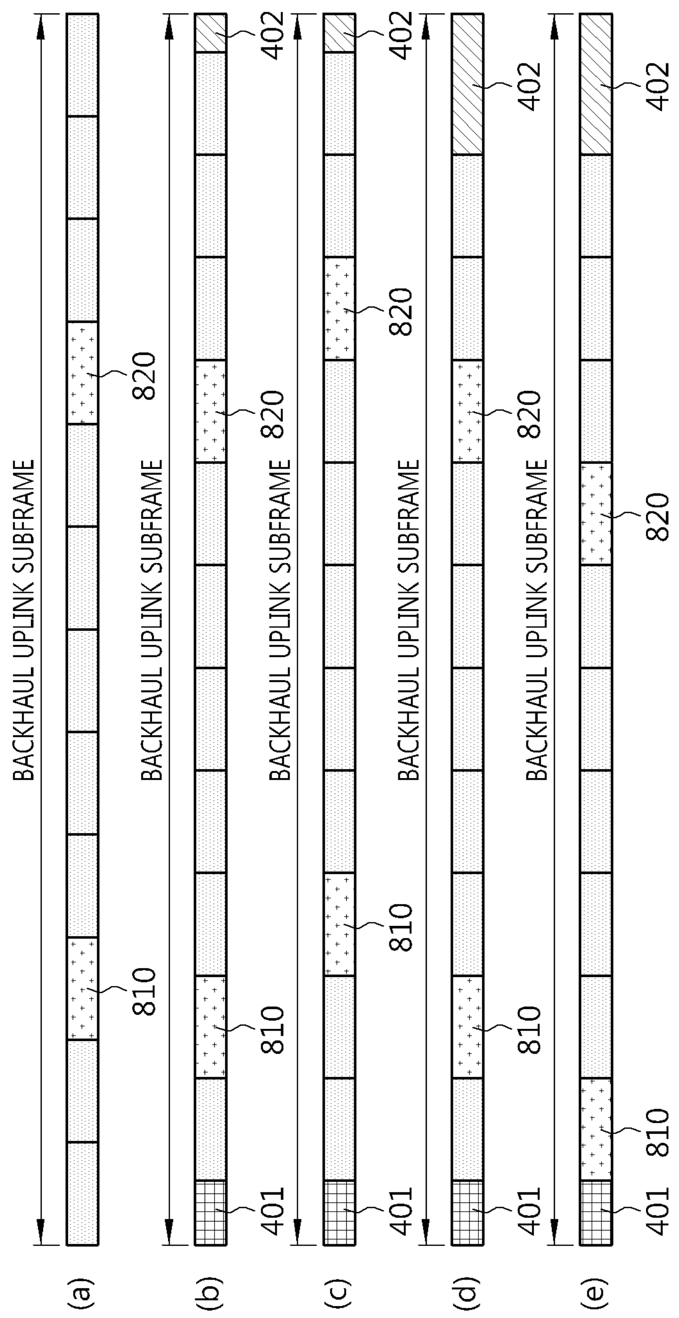
FIG. 20 illustrates frame structures according to exemplary embodiments of the present invention when two backhaul uplink demodulation reference signals are present in a backhaul uplink subframe including 12 symbols.

FIGS. 19 and 20 show disposition of two backhaul uplink demodulation reference signals 810 and 820 in a backhaul uplink subframe. FIG. 19 shows cases in which a backhaul uplink subframe has the same length as 14 symbols, and FIG. 20 shows cases in which a backhaul uplink subframe has the same length as 12 symbols.

Also, it is assumed in FIGS. 19 and 20 that a backhaul uplink physical data channel is transmitted through the last symbol of a backhaul uplink subframe. However, depending on a backhaul uplink subframe, a backhaul uplink channel measurement reference signal may be transmitted through the last symbol of the backhaul uplink subframe.

FIGS. 19(A) to (E) show structures of a backhaul uplink subframe including 14 symbols in which the two backhaul uplink demodulation reference signals 810 and 820 are present according to exemplary embodiments of the present invention.

The backhaul uplink subframe structure of FIG. 19(A) corresponds to a case in which a guard period is small enough to be neglected. In this structure, the first backhaul uplink demodulation reference signal 810 is disposed at the fourth symbol, and the second backhaul uplink demodulation reference signal 820 is disposed at the eleventh symbol. There are six symbols between the two backhaul uplink demodulation reference signals 810 and 820.

The backhaul uplink subframe structure of FIG. 19(B) corresponds to a case in which a preceding guard period 401 is disposed ahead of a backhaul uplink signal period and a following guard period 402 is disposed behind the backhaul uplink signal period. In this case, 13 symbols in one subframe actually transmit a signal. In the subframe structure of FIG. 19(B), the first backhaul uplink demodulation reference signal 810 is disposed at the third symbol, the second backhaul uplink demodulation reference signal 820 is disposed at the tenth symbol, and six symbols are interposed between the two backhaul uplink demodulation reference signals 810 and 820.

Likewise, in the backhaul uplink subframe structure of FIG. 19(C), the preceding guard period 401 is disposed ahead of a backhaul uplink signal period, and the following guard period 402 is disposed behind the backhaul uplink signal period. In this case, 13 symbols in the one subframe actually transmit a signal. In the subframe structure of FIG. 19(C), the first backhaul uplink demodulation reference signal 810 is disposed at the fourth symbol, and the second backhaul uplink demodulation reference signal 820 is disposed at the eleventh symbol.

The backhaul uplink subframe structure of FIG. 19(D) also corresponds to a case in which the preceding guard period 401 is disposed ahead of a backhaul uplink signal period and the following guard period 402 is disposed behind the backhaul uplink signal period. However, this case has the longer following guard period 402 than the foregoing cases, and 12 symbols in one subframe actually transmit a signal. In the subframe structure of FIG. 19(D), the first backhaul uplink demodulation reference signal 810 is disposed at the third symbol, and the second backhaul uplink demodulation reference signal 820 is disposed at the tenth symbol.

The backhaul uplink subframe structure of FIG. 19(E) has guard periods having the same length as those of FIG. 19(D), and also 12 symbols in one subframe actually transmit a signal. In the subframe structure of FIG. 19(E), the first backhaul uplink demodulation reference signal 810 is disposed at the second symbol, and the second backhaul uplink demodulation reference signal 820 is disposed at the ninth symbol.

In brief, two backhaul uplink demodulation reference signals are disposed in one backhaul uplink subframe having a backhaul uplink subframe structure according to an exemplary embodiment of FIG. 19, and as many symbols as (half the maximum number of symbols that one backhaul uplink subframe can include−1) are interposed between the two demodulation reference signals. In other words, in FIG. 19, a total of 14 symbols can exist as the maximum in one backhaul uplink subframe, and as many symbols as (14/2−1), that is, six symbols, are interposed between the first backhaul uplink demodulation reference signal 810 and the second backhaul uplink demodulation reference signal 820.

FIGS. 20(A) to 20(E) show structures of a backhaul uplink subframe including 12 symbols in which the two backhaul uplink demodulation reference signals are present according to exemplary embodiments of the present invention.

The backhaul uplink subframe structure of FIG. 20(A) corresponds to a case in which a guard period is small enough to be neglected. In this structure, a first backhaul uplink demodulation reference signal 810 is disposed at the third symbol, and a second backhaul uplink demodulation reference signal 820 is disposed at the ninth symbol. Five symbols are interposed between the two backhaul uplink demodulation reference signals 810 and 820.

The backhaul uplink subframe structure of FIG. 20(B) corresponds to a case in which a preceding guard period 401 is disposed ahead of a backhaul uplink signal period and a following guard period 402 is disposed behind the backhaul uplink signal period. In this case, 11 symbols in one subframe actually transmit a signal. In the subframe structure of FIG. 20(B), the first backhaul uplink demodulation reference signal 810 is disposed at the second symbol, the second backhaul uplink demodulation reference signal 820 is disposed at the eighth symbol, and five symbols are disposed between the two backhaul uplink demodulation reference signals 810 and 820.

Likewise, the backhaul uplink subframe structure of FIG. 20(C) has preceding and following guard periods having the same length as those of FIG. 20(B). In the subframe structure of FIG. 20(C), the first backhaul uplink demodulation reference signal 810 is disposed at the third symbol, and the second backhaul uplink demodulation reference signal 820 is disposed at the ninth symbol.

The backhaul uplink subframe structure of FIG. 20(D) also corresponds to a case in which guard periods are disposed ahead of and behind a backhaul uplink signal period. However, this case has the longer following guard period 402 than the foregoing cases, and 10 symbols in one subframe actually transmit a signal. In the subframe structure of FIG. 20(D), the first backhaul uplink demodulation reference signal 810 is disposed at the second symbol, and the second backhaul uplink demodulation reference signal 820 is disposed at the eighth symbol.

The backhaul uplink subframe structure of FIG. 20(E) has the guard periods 401 and 402 having the same length as those of FIG. 20(D), and also 10 symbols in one subframe actually transmit a signal. In the subframe structure of FIG. 20(E), the first backhaul uplink demodulation reference signal 810 is disposed at the first symbol, and the second backhaul uplink demodulation reference signal 820 is disposed at the seventh symbol.

In brief, the same principle is applied to the exemplary embodiments of FIGS. 19 and 20. To be specific, two backhaul uplink demodulation reference signals are disposed in one backhaul uplink subframe having a backhaul uplink subframe structure according to an exemplary embodiment, and as many symbols as (half the maximum number of symbols that one backhaul uplink subframe can include−1) are interposed between the two demodulation reference signals. In other words, in FIG. 20, a total of 12 symbols can exist as the maximum in one backhaul uplink subframe, and as many symbols as (12/2−1), that is, five symbols, are interposed between the first backhaul uplink demodulation reference signal 810 and the second backhaul uplink demodulation reference signal 820.

Figure 21:
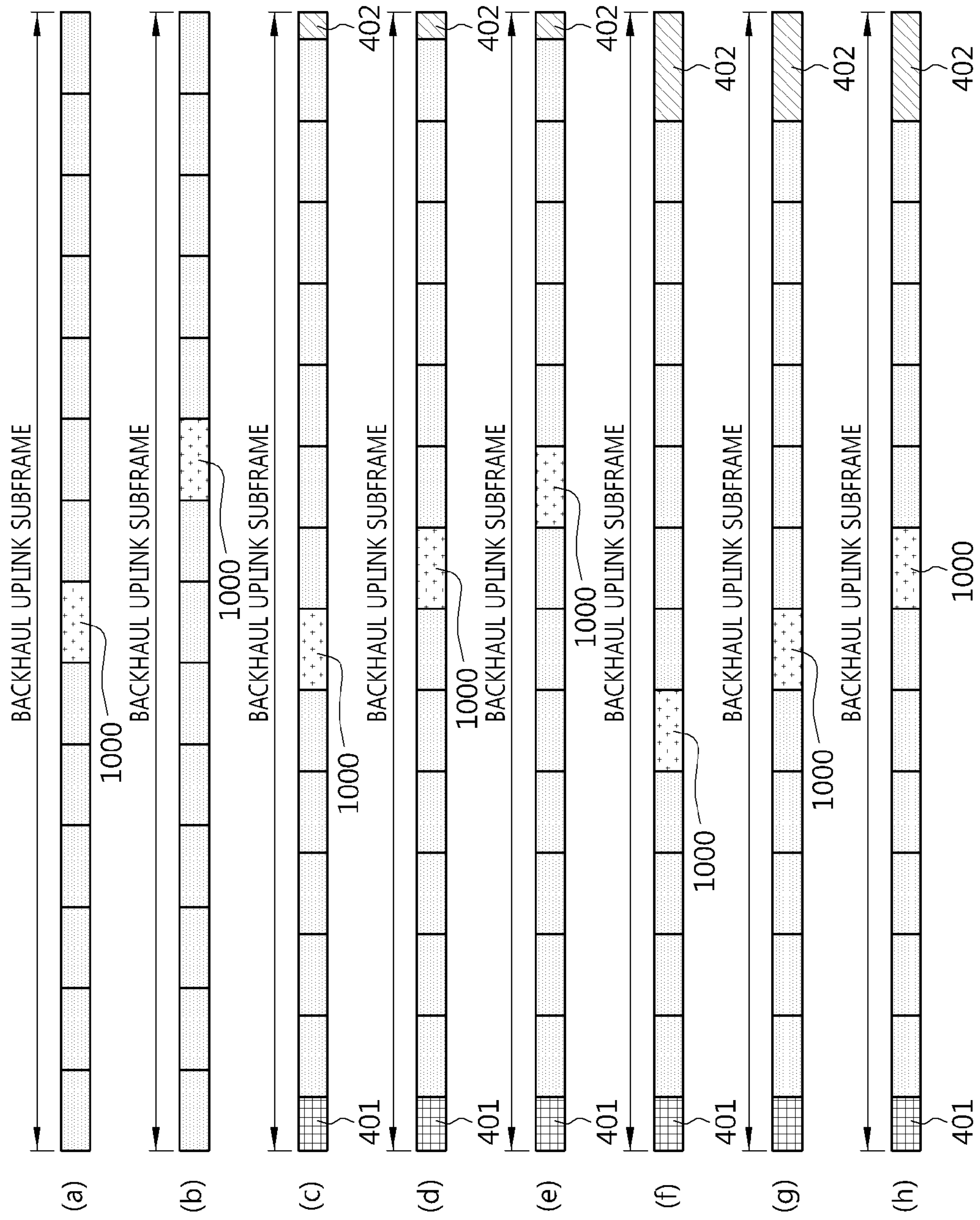
FIG. 21 illustrates frame structures according to exemplary embodiments of the present invention when one backhaul uplink demodulation reference signal is disposed in a backhaul uplink subframe including 14 symbols.
Figure 22:
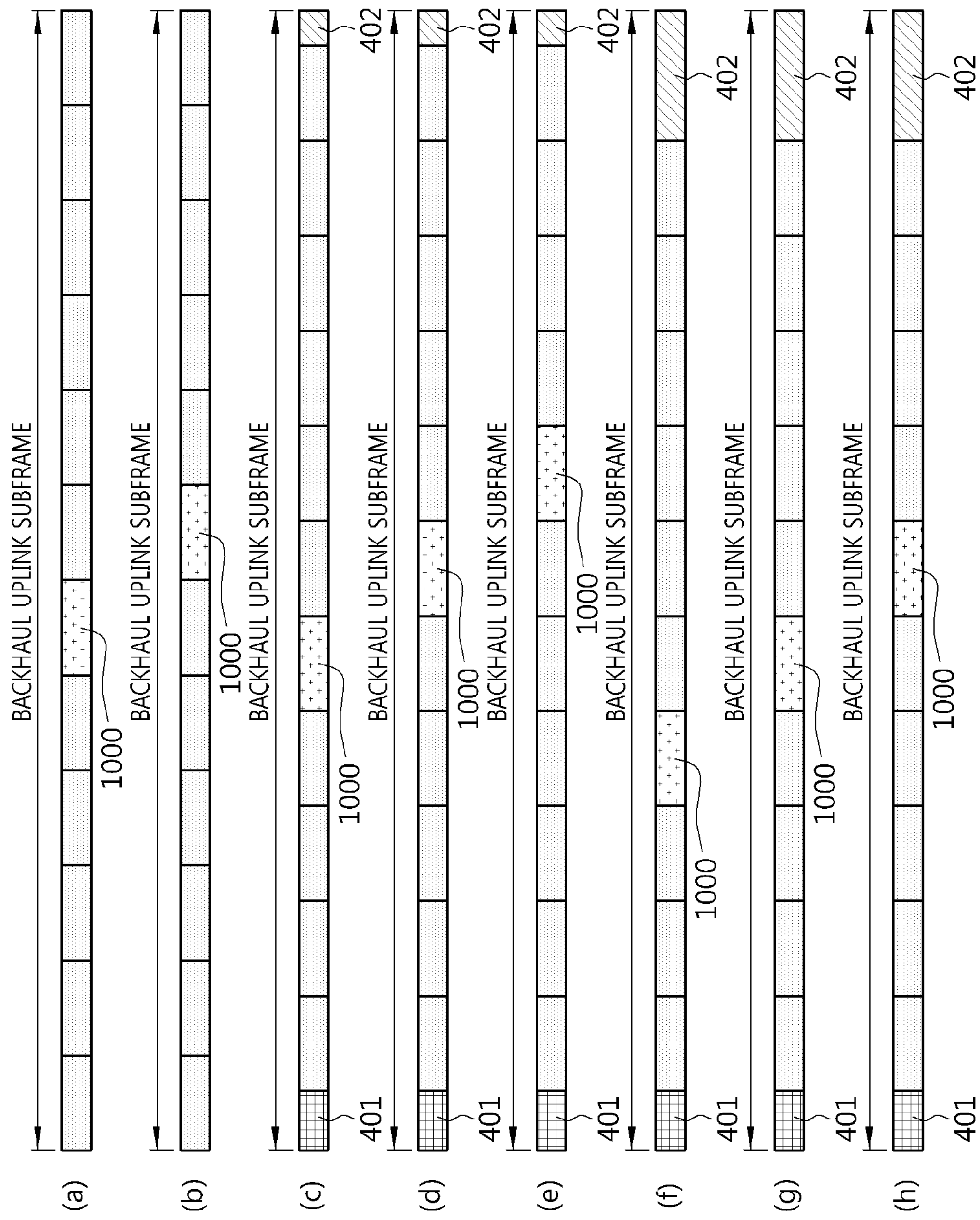
FIG. 22 illustrates frame structures according to exemplary embodiments of the present invention when one backhaul uplink demodulation reference signal is disposed in a backhaul uplink subframe including 12 symbols.

FIGS. 21 and 22 show disposition of one backhaul uplink demodulation reference signal in a backhaul uplink subframe when there is the one backhaul uplink demodulation reference signal in the backhaul uplink subframe.

FIG. 21 shows frame structures according to exemplary embodiments of the present invention when one backhaul uplink demodulation reference signal 1000 is disposed in a backhaul uplink subframe having 14 symbols.

FIGS. 21(A) and 21(B) show cases in which a guard period is small enough to be neglected, and FIGS. 21(C) to 21(H) show cases in which a preceding guard period 401 is disposed ahead of a backhaul uplink signal period and a following guard period 402 is disposed behind the backhaul uplink signal period. As can be seen from FIG. 21, the length of a guard period may vary according to various factors, and the lengths of guard periods shown in FIG. 21 are merely exemplary embodiments.

It is assumed in FIG. 21 that a backhaul uplink physical data channel is transmitted through the last symbol of a backhaul uplink subframe. However, depending on a backhaul uplink subframe, a backhaul uplink channel measurement reference signal may be transmitted through the last symbol of the backhaul uplink subframe.

In FIGS. 21(A) and 21(B), a guard period is small enough to be neglected, and thus a backhaul uplink signal period in which a signal is actually transmitted consists of 14 symbols. FIG. 21(A) shows a case in which the backhaul uplink demodulation reference signal 1000 is disposed at the seventh symbol among the 14 symbols, and FIG. 21(B) shows a case in which the backhaul uplink demodulation reference signal 1000 is disposed at the eighth symbol.

FIGS. 21(C) to 21(E) correspond to cases in which the preceding guard period 401 is disposed ahead of a backhaul uplink signal period and the following guard period 402 is disposed behind the backhaul uplink signal period, and a backhaul uplink signal period in which a signal is actually transmitted consists of 13 symbols. FIG. 21(C) shows a case in which the backhaul uplink demodulation reference signal 1000 is disposed at the sixth symbol among the 13 symbols, FIG. 21(D) shows a case in which the backhaul uplink demodulation reference signal 1000 is disposed at the seventh symbol, and FIG. 21(E) shows a case in which the backhaul uplink demodulation reference signal 1000 is disposed at the eighth symbol.

FIGS. 21(F) to 21(H) correspond to cases in which the following guard period 402 is longer than those of FIGS. 21(C) to 21(E), and a backhaul uplink signal period in which a signal is actually transmitted consists of 12 symbols. FIG. 21(F) shows a case in which the backhaul uplink demodulation reference signal 1000 is disposed at the fifth symbol among the 12 symbols, FIG. 21(G) shows a case in which the backhaul uplink demodulation reference signal 1000 is disposed at the sixth symbol, and FIG. 21(H) shows a case in which the backhaul uplink demodulation reference signal 1000 is disposed at the seventh symbol.

In an uplink transmission method illustrated in FIG. 21 according to an exemplary embodiment of the present invention, an uplink frame is configured to have one backhaul uplink subframe in which only one backhaul uplink demodulation reference signal is disposed. Here, the backhaul uplink demodulation reference signal 1000 is disposed at a position in the backhaul uplink subframe where a difference between the number of symbols preceding the backhaul uplink demodulation reference signal and the number of symbols following the backhaul uplink demodulation reference signal does not exceed three.

FIG. 22 shows frame structures according to exemplary embodiments of the present invention when one backhaul uplink demodulation reference signal is disposed in a backhaul uplink subframe having 12 symbols.

FIGS. 22(A) and 22(B) show cases in which a guard period is small enough to be neglected, and FIGS. 22(C) to 22(H) show cases in which a preceding guard period 401 is disposed ahead of a backhaul uplink signal period and a following guard period 402 is disposed behind the backhaul uplink signal period. As can be seen from FIG. 22, the length of a guard period may vary according to various factors, and the lengths of guard periods shown in FIG. 22 are merely exemplary embodiments.

It is assumed in FIG. 22 that a backhaul uplink physical data channel is transmitted through the last symbol of a backhaul uplink subframe. However, depending on a backhaul uplink subframe, a backhaul uplink channel measurement reference signal may be transmitted through the last symbol of the backhaul uplink subframe.

In FIGS. 22(A) and 22(B), a guard period is small enough to be neglected, and thus a backhaul uplink signal period in which a signal is actually transmitted consists of 12 symbols. FIG. 22(A) shows a case in which a backhaul uplink demodulation reference signal 1000 is disposed at the sixth symbol among the 12 symbols, and FIG. 22(B) shows a case in which the backhaul uplink demodulation reference signal 1000 is disposed at the seventh symbol.

FIGS. 22(C) to 22(E) correspond to cases in which guard periods are disposed ahead of and behind a backhaul uplink signal period, and a backhaul uplink signal period in which a signal is actually transmitted consists of 11 symbols. FIG. 22(C) shows a case in which the backhaul uplink demodulation reference signal 1000 is disposed at the fifth symbol among the 11 symbols, FIG. 22(D) shows a case in which the backhaul uplink demodulation reference signal 1000 is disposed at the sixth symbol, and FIG. 22(E) shows a case in which the backhaul uplink demodulation reference signal 1000 is disposed at the seventh symbol.

FIGS. 22(F) to 22(H) correspond to cases in which the following guard period 402 is longer than those of FIGS. 22(C) to 22(E), and a backhaul uplink signal period in which a signal is actually transmitted consists of 10 symbols. FIG. 22(F) shows a case in which the backhaul uplink demodulation reference signal 1000 is disposed at the fourth symbol among the 10 symbols, FIG. 22(G) shows a case in which the backhaul uplink demodulation reference signal 1000 is disposed at the fifth symbol, and FIG. 22(H) shows a case in which the backhaul uplink demodulation reference signal 1000 is disposed at the sixth symbol.

In brief, in an uplink transmission method illustrated in FIG. 22 according to an exemplary embodiment of the present invention, an uplink frame is configured to have one backhaul uplink subframe in which only one backhaul uplink demodulation reference signal is disposed. Here, the backhaul uplink demodulation reference signal 1000 is disposed at a position in the backhaul uplink subframe where a difference between the number of symbols preceding the backhaul uplink demodulation reference signal and the number of symbols following the backhaul uplink demodulation reference signal does not exceed three.

Backhaul downlink transmission according to still another aspect of the present invention will be described below.

As described above with reference to FIG. 2, a base station and a relay transmit and receive a backhaul downlink signal. The backhaul downlink signal may include a backhaul downlink physical data channel, a backhaul downlink physical control channel, a backhaul downlink reference signal, etc. and may further include another channel or signal in addition to the aforementioned channels or signal.

The start position of a backhaul downlink signal may vary according to the number of symbols through which a base station access downlink physical control channel of a base station access downlink signal is transmitted, the number of symbols through which a relay access downlink physical control channel of a relay access downlink signal is transmitted, a signal propagation delay between a base station and a relay, a time for the relay to switch from transmission to reception, a timing configuration of a relay access downlink subframe and so on. The end position of a backhaul downlink signal may vary according to a signal propagation delay between a base station and a relay, a time for the relay to switch from reception to transmission, the timing configuration of a relay access downlink subframe, and so on.

To determine the start position of a backhaul downlink signal, a relay may transmit information about the number of symbols through which a relay access downlink physical control channel is transmitted to a base station. Alternatively, the base station may transmit the information about the number of symbols through which a relay access downlink physical control channel is transmitted to the relay. The relay transmits the relay access downlink physical control channel according to the information received from the base station.

In a backhaul downlink physical control channel region, one or more backhaul downlink physical control channels are transmitted. Here, a region denotes a combination of a time domain, frequency domain, spatial domain, code domain, and so on. The start position of a time domain of a backhaul downlink physical control channel region may be predefined, and the start position information may not be signaled. Alternatively, the start position information may be transmitted by upper layer signaling (RRC signaling may be used in the case of 3GPP).

Here, the start position information of a time domain of a backhaul downlink physical control channel region denotes the index of a symbol in a base station access downlink subframe at which the time domain of the backhaul downlink physical control channel region begins. The end position of the time domain of the backhaul downlink physical control channel region may be predefined, and the end position information may not be signaled. Alternatively, the end position information may be transmitted by upper layer signaling (RRC signaling may be used in the case of 3GPP). Also, the end position information of the time domain of the backhaul downlink physical control channel region denotes the index of a symbol at which the time domain of the backhaul downlink physical control channel region ends in the base station access downlink subframe.

The position information of a frequency domain of a backhaul downlink physical control channel region can be transmitted by upper layer signaling (RRC signaling may be used in the case of 3GPP). Here, the position information of a frequency domain of a backhaul downlink physical control channel region indicates the position of a frequency domain in a system bandwidth at which a backhaul downlink physical control channel is transmitted, and can be known in subcarrier units or in units of sets of subcarriers.

The start position of a time domain of a backhaul downlink physical data channel may be predefined, and the start position information may not be signaled. Alternatively, the start position information may be transmitted by upper layer signaling (RRC signaling may be used in the case of 3GPP) or through a backhaul downlink physical control channel.

Here, the start position information of a time domain of a backhaul downlink physical data channel denotes the index of a symbol in a base station access downlink subframe at which the time domain of the backhaul downlink physical data channel begins. The symbol index may indicate the order of the symbol at which the time domain of the backhaul downlink physical data channel begins using an absolute value or a relative value with respect to the index of a specific symbol. The specific symbol may be a symbol at which the time domain of a backhaul downlink physical control channel region begins.

The end position of the time domain of the backhaul downlink physical data channel may be predefined, and the end position information may not be signaled. Alternatively, the end position information may be transmitted by upper layer signaling (RRC signaling may be used in the case of 3GPP).

Here, the end position information of the time domain of the backhaul downlink physical data channel denotes the index of a symbol in a base station access downlink subframe at which the time domain of the backhaul downlink physical data channel ends. The symbol index may indicate the order of the symbol at which the time domain of the backhaul downlink physical data channel ends using an absolute value or a relative value with respect to the index of a specific symbol. The specific symbol may be a symbol at which the time domain of a backhaul downlink physical control channel region ends.

Position information of a frequency domain of a backhaul downlink physical data channel can be transmitted through a backhaul downlink physical control channel. Here, the position information of a frequency domain of a backhaul downlink physical data channel denotes the position of a frequency domain in a system bandwidth at which a backhaul downlink physical control channel is transmitted, and can be known in subcarrier units or in units of sets of subcarriers. A frequency domain of a backhaul downlink physical data channel may include a frequency domain of a backhaul downlink physical control channel indicating the backhaul downlink physical data channel.

A subject related to information transmitted through a backhaul link between a base station and a relay as described above, in particular, transmission of relay system information through a backhaul link between a base station and a relay, will be described below.

When a relay operates in the UE mode of relay, the relay can receive base station cell system information, which is transmitted by a base station to which the relay belongs to UEs, relays, etc. within the base station cell, through a base station access downlink in the same process as a base station UE. In the UE mode of relay, relay system information which is common to relays is transmitted by signaling dedicated to each relay (e.g., RRC signaling in the case of a 3GPP system).

On the other hand, when a relay operates in the base station mode of relay, the relay transmits data to a relay UE. Thus, the relay cannot receive a base station access downlink and may not receive relay system information.

Here, the relay system information denotes information that can be applied in common to all relays interoperating with a base station among information transmitted by the base station to a relay when the base station interoperates with at least one relay. Information about a backhaul downlink physical control channel region can be an example of relay system information. Information about a backhaul downlink physical control channel region may include the position information of time resources and frequency resources of a backhaul downlink physical control channel. The position information of time resources can be expressed by indices of a start symbol and an end symbol. The position information of frequency resources can be expressed by indices of a start frequency resource and an end frequency resource (physical resource block (PRB) indices in the case of 3GPP), or in the form of a bitmap. In the form of a bitmap, only resources through which a backhaul downlink physical control channel is transmitted among all frequency resources are expressed by 1.

Relay system information may also include a part of the system information of a base station cell that is transmitted by a base station, to which a relay belongs, to UEs, relays, etc., within the base station cell.

It has been mentioned above that a relay may not receive relay system information through a base station access downlink when the relay operates in the base station mode of relay. To solve this problem according to an exemplary embodiment of the present invention, relay system information can be transferred through a backhaul downlink while a relay operates in the base station mode of relay.

In an exemplary embodiment of the present invention, relay system information is transmitted through a backhaul downlink physical control channel among resources allocated to a backhaul downlink, and for convenience, the backhaul downlink physical control channel is referred to as a relay-common backhaul downlink physical control channel. A relay-common backhaul downlink physical control channel may include information about a position in time and frequency domains, modulation, encoding, etc. of a backhaul downlink physical data channel through which relay system information is transmitted.

Since a relay-common backhaul downlink physical control channel is information about a plurality of relays, the relays should be able to demodulate the information. To this end, data for checking a transmission error of a relay-common backhaul downlink physical control channel, for example, cyclic redundancy check (CRC) can be masked with a relay-common identifier. For example, a relay system information-radio network temporary identifier (RSI-RNTI) can be used as the relay-common identifier.

Figure 23:
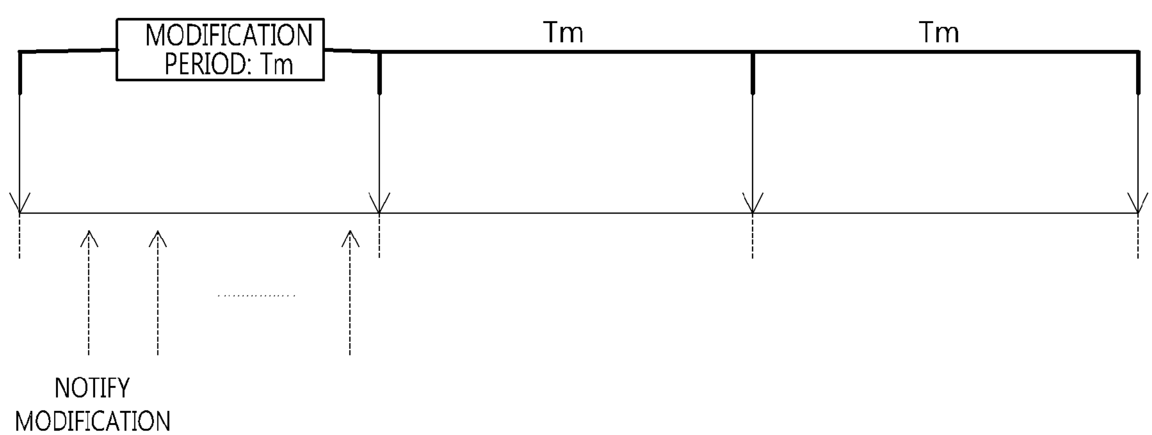
FIG. 23 illustrates a transmission period of relay system information according to an exemplary embodiment of the present invention.

FIG. 23 illustrates a transmission period of relay system information according to an exemplary embodiment of the present invention.

Relay system information according to an exemplary embodiment of the present invention can be modified by predetermined periods Tm and is not modified during one period. For convenience, such a period is referred to as a relay system information modification period. A relay system information modification period may be set to, for example, at least one radio frame or at least one subframe. The length information of a relay system information modification period can be included in relay system information and transmitted.

A notification about whether relay system information is modified in the next modification period may be included in a relay-common backhaul downlink physical control channel, and such a notification of relay system information modification may be included one or more times in one modification period Tm. The notification of relay system information modification can be implemented, for example, in the form of a bit indicating whether or not relay system information is modified. When the corresponding bit is “1,” it may mean that the relay system information is modified in a next modification period, and the corresponding relay may receive and apply modified relay system information in the next modification period. When the corresponding bit is “0,” it may mean that the relay system information is not modified in the next modification period.

Next, it will be described below how to allocate the above described subframes used for a base station access downlink, through which a backhaul downlink signal is transmitted, and a backhaul uplink.

A base station can allocate a base station access downlink subframe, through which one or more backhaul uplink signals are transmitted, to a relay. The base station access downlink subframe allocation information may be transferred in the form of a bitmap by upper layer signaling (RRC signaling in the case of 3GPP). In the form of a bitmap, 0 or 1 is used to indicate whether or not a backhaul downlink signal has been transmitted in respective base station access downlink subframes constituting one or more base station access downlink frames. For example, 1 means that a backhaul downlink signal has been transmitted in the corresponding base station access downlink subframe, and 0 means that a backhaul downlink signal has not been transmitted in the corresponding base station access downlink subframe.

Also, the base station access downlink subframe allocation information may be transferred by upper layer signaling (RRC signaling in the case of 3GPP) in the form of one or more transmission periods and the position information of a base station access downlink subframe in a base station access downlink frame corresponding to each transmission period.

The base station may transmit the allocation information of a base station access downlink subframe, through which the same backhaul downlink signal is transmitted, to all relays receiving a backhaul downlink signal from the base station itself, or transmit different base station access downlink subframe allocation information to the respective relays. Alternatively, the base station may classify relays receiving a backhaul downlink signal from the base station itself into a plurality of relay groups and transmit the allocation information of base station access downlink subframes, through which different backhaul downlink signals are transmitted, to the respective relay groups. Here, a relay group may consist of one or more relays, and relays in a specific relay group receive the allocation information of a base station access downlink subframe through which the same backhaul downlink signal is transmitted.

Also, a base station can allocate one or more backhaul uplink subframes to a relay. Such backhaul uplink subframe allocation information may be transferred in the form of a bitmap by upper layer signaling (RRC signaling in the case of 3GPP). In the form of a bitmap, 0 or 1 is used to indicate whether or not to transmit a backhaul uplink signal in one backhaul uplink subframe or each of a plurality of backhaul uplink frames. For example, 1 instructs to transmit a backhaul uplink signal in the corresponding backhaul uplink subframe, and 0 instructs not to transmit a backhaul uplink signal in the corresponding backhaul uplink subframe. Also, the backhaul uplink subframe allocation information may be transferred by upper layer signaling (RRC signaling in the case of 3GPP) in the form of one or more transmission periods and the position information of a backhaul uplink subframe in a backhaul uplink frame corresponding to each transmission period.

The base station may transmit the same backhaul uplink subframe allocation information to all relays transmitting backhaul uplink signals to the base station itself, or transmit different backhaul uplink subframe allocation information to the respective relays. Alternatively, the base station may classify relays transmitting backhaul uplink signals to the base station itself into a plurality of relay groups and transmit different backhaul uplink subframe allocation information to the respective relay groups. Here, a relay group consists of one or more relays, and relays in a specific relay group receive the same backhaul uplink subframe allocation information from the base station.

Valid period information of a backhaul downlink/uplink physical data channel will be described below.

A base station transmits resource allocation information of a backhaul downlink physical data channel to a relay, and the resource allocation information may include the position of the backhaul downlink physical data channel on physical resources, such as time, frequency, and space, a modulation method, hybrid automatic repeat request (HARQ) information, and so on. When the base station transmits a backhaul downlink physical data channel to the relay, the base station can transmit resource allocation information for each backhaul downlink physical data channel. Alternatively, the base station may transmit only one piece of resource allocation information for a plurality of backhaul downlink physical data channels to the relay. In this case, valid period information can be included in the resource allocation information. Here, the valid period information denotes how many backhaul downlink physical data channels the resource allocation information including the valid period information is applied to. For example, when valid period information indicates n, the same resource allocation information including the valid period information is applied to n backhaul downlink physical data channels. Here, a backhaul downlink physical data channel to which the valid period information is applied may correspond to HARQ retransmission or initial transmission excluding HARQ retransmission.

Also, the base station transmits resource allocation information of a backhaul uplink physical data channel to the relay, and the resource allocation information may include the position of the backhaul uplink physical data channel on physical resources, such as time, frequency, and space, a modulation method, HARQ information, and so on. When the base station transmits a backhaul uplink physical data channel to the relay, the base station can transmit resource allocation information for each backhaul uplink physical data channel. Alternatively, the base station may transmit only one piece of resource allocation information for a plurality of backhaul uplink physical data channels to the relay. In this case, valid period information can be included in the resource allocation information. The valid period information denotes how many backhaul uplink physical data channels the resource allocation information including the valid period information is applied to. For example, when valid period information indicates n, the same resource allocation information including the valid period information is applied to n backhaul uplink physical data channels.

An ACK/NACK mechanism that can be applied to a backhaul link between a base station and a relay will be described below in relation to the wireless environment of the backhaul link.

When a relay receives a backhaul downlink physical data channel, the relay transmits information about whether or not demodulation is successful, that is, ACK or NACK, through a backhaul uplink according to whether or not demodulation of a backhaul downlink physical data channel is successful. When one backhaul downlink physical data channel consists of a plurality of codewords, information about whether or not demodulation is successful can be transmitted according to the respective codewords. A plurality of pieces of information about whether or not demodulation is successful can be transmitted through one or more modulation symbols.

Resources through which a relay will transfer information about whether or not demodulation is successful may correspond to resources, through which a backhaul downlink physical control channel including the allocation information of a backhaul downlink physical data channel has been transmitted, on a one-to-one basis. In this case, when the resources through which a backhaul downlink physical control channel has been transmitted are changed, the resources through which information about whether or not demodulation is successful is transmitted are also changed. Here, resources consist of a combination of time domain resources, frequency domain resources, code domain resources, cyclic shift domain resources, and so on.

Also, resources through which information about whether or not demodulation is successful is transmitted may have no relation with resources through which a backhaul downlink physical control channel is transmitted. In this case, a base station can notify a relay of the resources through which information about whether or not demodulation is successful is transmitted by upper layer signaling (RRC signaling may be used in the case of 3GPP), and the relay transmits the information about whether or not demodulation is successful using the resources.

Resources through which information about whether or not demodulation is successful is transmitted may be determined by two factors. One factor corresponds to resources through which a backhaul downlink physical control channel has been transmitted on a one-to-one basis, and the other factor has no relation with the resources through which a backhaul downlink physical control channel has been transmitted.

There has been active discussion recently regarding a transmission method in a downlink or uplink between a base station and a UE using multiple input multiple output (MIMO). In relation to this, MIMO technology whereby multiple wireless paths are generated such as 8×8 MIMO or 4×8 MIMO is under examination. When such advanced MIMO technology is applied, a plurality of codewords can be used (generally up to two codewords), and ACK/NACK information is separately configured for each codeword and transmitted.

In general, relays are installed at a high level such as on the top of a building, and thus, many wireless environments between a base station and a relay have line of sight (LOS). When MIMO technology is applied to such an LOS environment, there is a strong possibility of correlation between transmission paths. Thus, in a backhaul link between a relay and a base station in a backhaul transmission method according to an exemplary embodiment of the present invention, response information, that is, ACK/NACK information is not separately transmitted according to codewords, but only one piece of response information, that is, ACK/NACK information, is configured, that is, bundled for all codewords, and transmitted. To be specific, for example, an AND operation is performed on success and/or failure in transmitting respective codewords. In this case, ACK information is transmitted only when the plural codewords are successfully transmitted, and otherwise, NACK information is transmitted. While two bits are conventionally required for ACK/NACK transmission in a backhaul link when two codewords are used, only one bit is used according to an exemplary embodiment of the present invention, so that transmission efficiency can be improved.

In the case of a backhaul uplink signal, it is possible to consider that backhaul uplink physical data consisting of a plurality of codewords is transmitted in one backhaul uplink subframe, and bundling of ACK/NACK information for the codewords is applied to the one backhaul uplink subframe. Bundling of ACK/NACK information may be applied to a plurality of backhaul uplink subframes. When backhaul uplink physical data consisting of a plurality of codewords is transmitted in each backhaul uplink subframe, ACK/NACK bundling may be separately performed on the first codewords and the second codewords of the respective backhaul uplink subframes.

A base station can notify a relay of whether or not bundling of ACK/NACK information is applied. When the base station applies bundling of ACK/NACK information to the relay, the relay bundles and transmits ACK/NACK information about all the codewords of a backhaul downlink physical data channel to the base station, and the base station also bundles and transmits ACK/NACK information about all the codewords of a backhaul uplink physical data channel to the relay. Meanwhile, when the base station does not apply bundling of ACK/NACK information to the relay, the relay transmits ACK/NACK information about the respective codewords of a backhaul downlink physical data channel to the base station, and the base station also transmits ACK/NACK information about the respective codewords of a backhaul uplink physical data channel to the relay.

In an exemplary embodiment of the present invention, a bundling mode, that is, a mode in which ACK/NACK information about all codewords is bundled and transmitted, is applied to transmit ACK/NACK information between a base station and a relay, and in an exceptional case in which, for example, a wireless environment between the base station and the relay rapidly varies, the bundling mode is released and a normal node can be applied.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A downlink transmission method of a base station in a mobile communication network including a relay, comprising:

transmitting a backhaul downlink signal to the relay using backhaul downlink symbols starting from the subsequent symbol of at least one excluded symbol of a base station access downlink subframe and ending with the last symbol of the base station access downlink subframe, wherein the at least one excluded symbol includes a predetermined number of symbols beginning with the first symbol of the base station access downlink subframe, wherein the at least one excluded symbol is the first symbol, the first and second symbols, or the first to third symbols of the base station access downlink subframe, wherein information on the location of the first symbol of the backhaul downlink symbols is transmitted by radio resource control (RRC) signaling, in case the base station access downlink subframe includes 14 symbols, the RRC signaling informs the relay that the backhaul downlink symbols are from the $2^{nd}$ symbol to the $14^{th}$ symbol, from the $3^{rd}$ symbol to the $14^{th}$ symbol, or from the $4^{th}$ symbol to the $14^{th}$ symbol.

2. The downlink transmission method of claim 1, wherein the at least one excluded symbol is determined in consideration of at least one of a time for the relay to switch between transmission and reception and a signal transmission time.

3. A downlink transmission method of a base station in a mobile communication network including a relay, comprising:

transmitting a backhaul downlink signal to the relay using backhaul downlink symbols starting from the subsequent symbol of at least one excluded symbol of a base station access downlink subframe and ending with the second to the last symbol of the base station access downlink subframe, wherein the at least one excluded symbol includes a predetermined number of symbols beginning with the first symbol of the base station access downlink subframe, wherein the at least one excluded symbol is the first symbol, the first and second symbols, or the first to third symbols of the base station access downlink subframe, wherein information on the location of the first symbol of the backhaul downlink symbols is transmitted by radio resource control (RRC) signaling, in case the base station access downlink subframe includes 14 symbols, the RRC signaling informs the relay that the backhaul downlink symbols are from the $2^{nd}$ symbol to the $14^{th}$ symbol, from the $3^{rd}$ symbol to the $14^{th}$ symbol, or from the $4^{th}$ symbol to the $14^{th}$ symbol.

4. A method for a relay to receive a downlink signal from a base station, comprising:

receiving a backhaul downlink signal from the base station using backhaul downlink symbols starting from the subsequent symbol of at least one excluded symbol of a base station access downlink subframe and ending with the last symbol of the base station access downlink subframe, wherein the at least one excluded symbol includes a predetermined number of symbols beginning with the first symbol of the base station access downlink subframe, wherein the at least one excluded symbol is the first symbol, the first and second symbols, or the first to third symbols of the base station access downlink subframe, wherein information on the location of the first symbol of the backhaul downlink symbols is transmitted by radio resource control (RRC) signaling, in case the base station access downlink subframe includes 14 symbols, the RRC signaling informs the relay that the backhaul downlink symbols are from the $2^{nd}$ symbol to the $14^{th}$ symbol, from the $3^{rd}$ symbol to the $14^{th}$ symbol, or from the $4^{th}$ symbol to the $14^{th}$ symbol.

5. A method for a relay to receive a downlink from a base station in a mobile communication network, comprising:

receiving a backhaul downlink signal using backhaul downlink symbols starting from the subsequent symbol of at least one excluded symbol of a base station access downlink subframe and ending with the second to the last symbol of the base station access downlink subframe, wherein the at least one excluded symbol includes a predetermined number of symbols beginning with the first symbol of the base station access downlink subframe, wherein the at least one excluded symbol is the first symbol, the first and second symbols, or the first to third symbols of the base station access downlink subframe, wherein information on the location of the first symbol of the backhaul downlink symbols is transmitted by radio resource control (RRC) signaling, in case the base station access downlink subframe includes 14 symbols, the RRC signaling informs the relay that the backhaul downlink symbols are from the $2^{nd}$ symbol to the $14^{th}$ symbol, from the $3^{rd}$ symbol to the $14^{th}$ symbol, or from the $4^{th}$ symbol to the $14^{th}$ symbol.

* * * * *